(12) United States Patent
Guim Bernat et al.

(10) Patent No.: US 11,899,526 B2
(45) Date of Patent: Feb. 13, 2024

(54) METHODS, APPARATUS AND ARTICLES OF MANUFACTURE TO PERFORM SERVICE FAILOVER

(71) Applicant: Intel Corporation, Santa Clara, CA (US)

(72) Inventors: Francesc Guim Bernat, Barcelona (ES); Kshitij Doshi, Tempe, AZ (US); Christian Maciocco, Portland, OR (US); Satish Jha, Portland, OR (US); Vesh Raj Sharma Banjade, Portland, OR (US); S M Iftekharul Alam, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/554,902

(22) Filed: Dec. 17, 2021

(65) Prior Publication Data

US 2022/0107862 A1   Apr. 7, 2022

(51) Int. Cl.
*G06F 11/07* (2006.01)
*G06F 21/33* (2013.01)
*G06F 11/30* (2006.01)

(52) U.S. Cl.
CPC ........ *G06F 11/0772* (2013.01); *G06F 11/079* (2013.01); *G06F 11/0793* (2013.01); *G06F 11/3006* (2013.01); *G06F 21/33* (2013.01)

(58) Field of Classification Search
CPC ............... G06F 11/0772; G06F 11/079; G06F 11/0793; G06F 11/3006
See application file for complete search history.

(56) References Cited

U.S. PATENT DOCUMENTS

| | | | |
|---|---|---|---|
| 7,200,622 B2 * | 4/2007 | Nakatani | H04L 67/1034 709/215 |
| 8,438,254 B2 * | 5/2013 | Hopen | H04L 67/1034 709/224 |
| 10,152,357 B1 * | 12/2018 | Espy | G06F 11/3051 |
| 11,088,896 B2 * | 8/2021 | Wang | H04L 43/20 |

* cited by examiner

*Primary Examiner* — Nadeem Iqbal
(74) *Attorney, Agent, or Firm* — Hanley, Flight & Zimmerman, LLC

(57) ABSTRACT

Example apparatus to perform service failover as disclosed herein are to detect a failure condition associated with execution of a service by a first compute platform, the execution of the service responsive to a first request. Disclosed example apparatus are also to send a second request to a second compute platform to execute the service. Disclosed example apparatus are further to monitor a queue of the first compute platform for a response to the first request, the response to indicate execution of the service by the first compute platform has completed, and when the response is detected in the queue, discard the response from the queue.

19 Claims, 18 Drawing Sheets

METHODS, APPARATUS AND ARTICLES OF MANUFACTURE TO PERFORM SERVICE FAILOVER

FIELD OF THE DISCLOSURE

This disclosure relates generally to computer systems and, more particularly, to methods, apparatus and articles of manufacture to perform service failover.

BACKGROUND

In a large scale compute infrastructure, such as cloud computing data center, compute platforms included in the infrastructure can be subjected to relative extreme operating conditions, such high temperatures, power fluctuations, power spikes, excessive processor and/or memory loading, etc. For example, a compute platform, such as a cloud server platform, operating under high temperatures may exhibit heavy processor and/or memory clocking oscillations due to throttling caused by heat. In some scenarios, a compute platform operating under such extreme conditions may become unresponsive, at least temporarily, and service requests may become lost or not achieve specified service level objectives, resulting in service failure.

BRIEF DESCRIPTION OF THE DRAWINGS

In general, the same reference numbers will be used throughout the drawing(s) and accompanying written description to refer to the same or like parts. The figures are not to scale.

Figure 1:
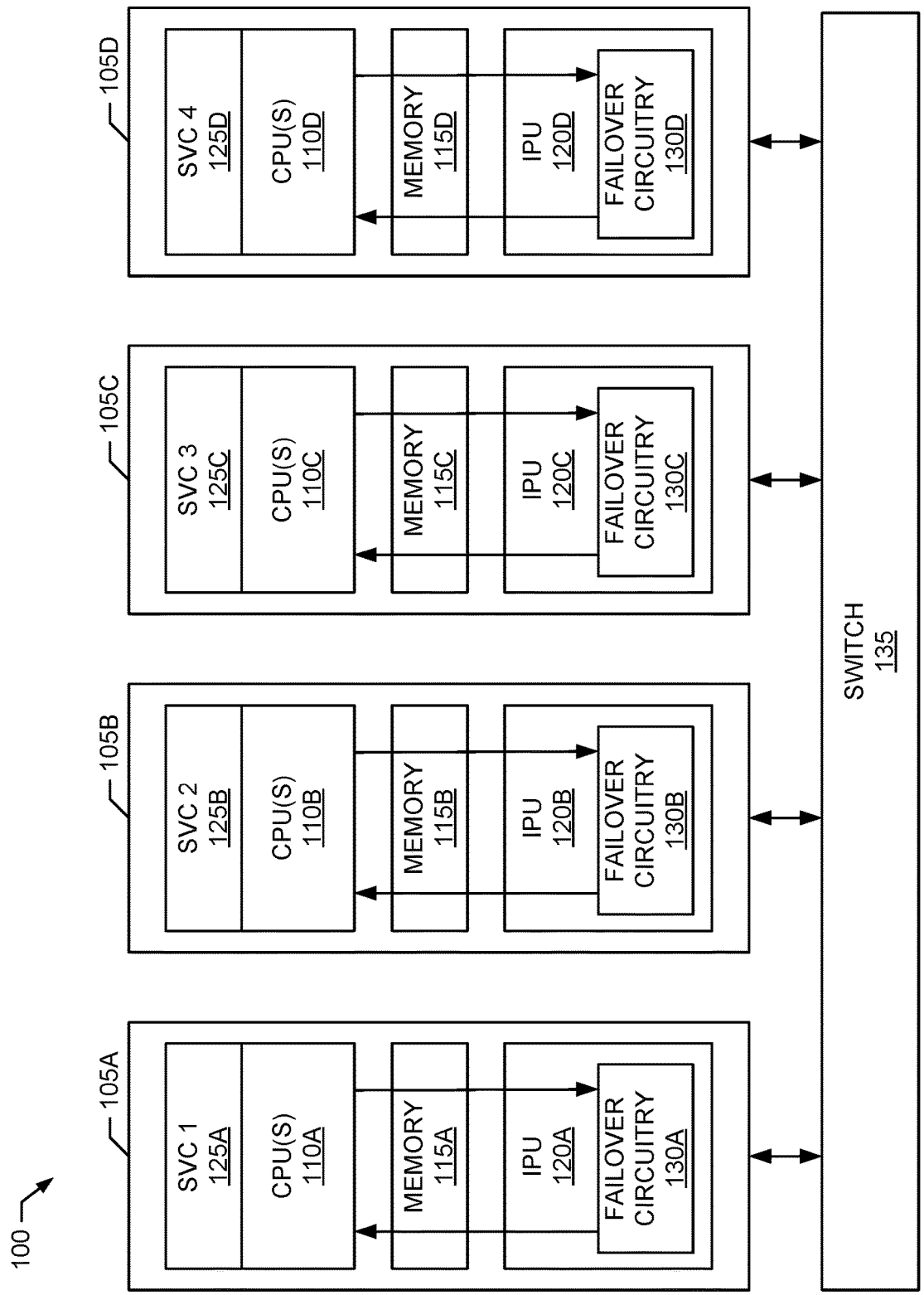
FIG. 1 is a block diagram of an example compute infrastructure including example compute platforms and an example switch structured to perform service failover in accordance with teachings of this disclosure.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Example methods, apparatus and articles of manufacture to perform service failover are disclosed herein. Applications targeted for execution in cloud computing infrastructure (e.g., data center), such as applications targeted for large-scale cloud native deployments, may be structured as a sequence, or chain, of microservices, which may include microservice sidecars. For example, a vehicular traffic monitoring application may be structured as a sequence of microservices that include one or more instances of a video decoder service, followed by one or more instances of a video filtering service, followed by one or more instances of an image composing service, followed by one or more instances of an object detection service, followed by one or more instances of a traffic event detection service. In some examples, multiple instances of a given one of the services (e.g., microservices) are deployed to different respective different compute platforms (e.g., server platforms) included in the cloud computing infrastructure. In some such examples, an orchestrator and/or load balancer of the cloud computing infrastructure assigns a request to execute a given service to a selected one of the instances of that service deployed to a corresponding one of the compute platform. In some such examples, a microservice sidecar is provided as a proxy between a request sender (e.g., which may also be a service) and multiple instances of a target service being requested. In such examples, the microservice sidecar is a proxy that decides (e.g., based on load balancing and/or any other criteria) which one of the target service instances is to receive the request from the sender. As noted above, a compute platform operating under extreme conditions may become unresponsive, at least temporarily, and service requests may become lost or not achieve specified service level objectives, resulting in service failure. If execution of the service on the compute platform stalls or fails, the cloud computing infrastructure may employ one or more service failover techniques to recover from the service failure.

For example, consider an example application A that is structured as a chain of services (e.g., microservices) S1 followed by S2 followed by S3, and so on, represented as:

$$S1 \rightarrow S2 \rightarrow S3 \rightarrow \ldots SN$$

Consider an example application execution scenario in which service S1 is executing on a first compute platform, and service S1 sends a request to execute service S2, which is received by an orchestrator of the cloud computing infrastructure. Assume a load balancer of the cloud computing infrastructure sends the request from S1 to an instance of S2, referred to in this example as S2', deployed on a second compute platform. Next, assume that the second compute platform becomes temporarily unresponsive, which causes the service S2' to fail to generate a response (e.g., a service completion response) in a timely manner. Further, assume this situation ultimately causes the application A to generate a timeout condition. For a monolithic application A, or a small-scale cloud deployment of application A, the orchestrator can implement service failover that would handle the timeout and initiate any cleanup, startup, etc., associated with execution of the service S2'.

However, for a large-scale cloud native deployment of application A, service failover is more challenging. For example, one challenge is that the service instance S2' may have failed to respond because of a transient failure associated with the second compute platform (e.g., cause by a connectivity issue, a reboot, excessive load on the platform, a platform failure, etc.) However, once the transient failure is resolved, the service S2' may generate its response, and when it does, the late response from S2' may produce an inconsistent state for stateful applications or a result in a duplicate service response for stateless applications (e.g., if the request for service S2 has already been reassigned to a different instance of S2, say S2", deployed on a different compute platform).

To avoid the foregoing problems, prior service failure techniques in large-scale cloud native deployments rely on global control loops that monitor service execution in the cloud computing infrastructure. Such prior global control loops may handle a service failure with an unwinding strategy that, for stateful applications, ensures transactional updates of the total application state that, in effect, create a tight coupling of state updates across the end-to-end flow of the application. For stateless applications, the unwinding strategy implemented by such prior global control loops may include stateless application discovery and resolution of duplicate responses to a service request. However, such prior global control loops can increase overall application latency and increase the total cost of ownership to implement the cloud computing infrastructure.

In contrast with such prior service failover techniques, example service failure implementations disclosed herein utilize an infrastructure processing unit (IPU), or similar processor circuitry, included in or otherwise associated with a compute platform to locally perform service failover at that compute platform. Furthermore, some example service failover implementations disclosed herein utilize a combination of the compute platform's IPU and a switch, or other networking device, interconnecting the compute platforms of the compute infrastructure to perform service failover, as well as enhance reliability of service completion to reduce the frequency at which service failover may need to be performed. For example, a disclosed example IPU may perform monitoring of service requests executing on its compute platform and perform local service failure techniques if a service failure condition is detected. In some examples, the IPU may also implemented a service request replication scheme that is triggered to improve the likelihood of meeting a service level objective associated with a service request. In some examples, the switch acts as a global agent that provides performance information to the IPU, which is used by the IPU to implement its service request replication scheme. In some examples, the IPU and/or the switch implement techniques to discard stale responses to service requests, which may break application flows, as described above.

In some types of applications, the services that execute service requests on the different compute platforms are dormant until a service request is received, which triggers execution of the service to which the service request is targeted. However, in some types of applications, the services on the different compute platforms are continuously running, and a service executes one or more operations in response to a service request targeted to that service. Furthermore, some types of applications include both of those types of services. The example service failure techniques disclosed herein are applicable any of those types of applications. Accordingly, the terms "request" and "service request" can refer to a service request that is to trigger execution of a service on a platform, or a service request that is to be executed by a service executing on a platform (e.g., that causes one or more operations to be performed by an executing service). Likewise, the terms "response" and "service response" can refer to a response indicating execution of a service (e.g., in response to a request) has completed, or a response indicating execution of a service request by a service has completed. As such, examples described below in the context of a request causing a service to execute also apply to examples in which a service request is executed by the target service, and vice versa.

Turning to the figures, FIG. 1 is a block diagram of an example compute infrastructure 100 that implements service failure in accordance with teachings of this disclosure. One or more elements of the example compute infrastructure 100 of FIG. 1 may be instantiated (e.g., creating an instance of, bring into being for any length of time, materialize, implement, etc.) by processor circuitry such as a central processing unit executing instructions. Additionally or alternatively, one or more of the elements of the example compute infrastructure 100 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 1 may, thus, be instantiated at the same or different times. Some or all of the circuitry may be instantiated, for example, in one or more threads executing concurrently on hardware and/or in series on hardware. Moreover, in some examples, some or all of the circuitry of FIG. 1 may be implemented by one or more virtual machines and/or containers executing on the microprocessor.

The example compute infrastructure 100 of FIG. 1, which may implement a cloud computing infrastructure, an edge computing infrastructure, or any other compute infrastructure, includes one or more example compute platforms 105A-D. Although four (4) compute platforms 105A-D are illustrated in FIG. 1, the example compute infrastructure 100 can include any number of compute platforms 105A-D. The compute platforms 105A-D of FIG. 1 can correspond to any type(s) of compute platforms, such as, but not limited to, one or more server platforms of a cloud computing infrastructure, one or more edge nodes of an edge computing infrastructure, one or more base stations of a mobile communication infrastructure, etc.

Figure 8:
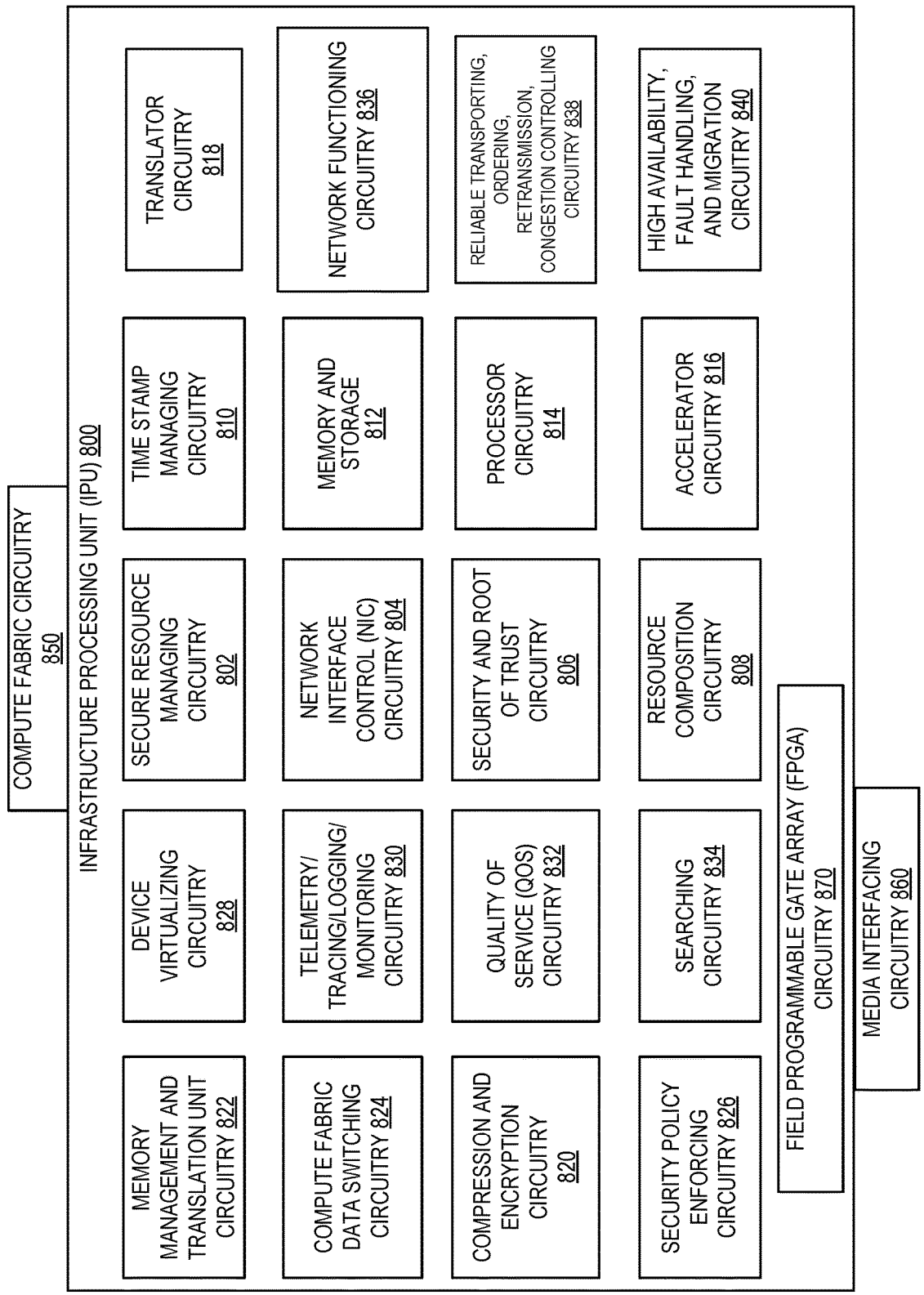
FIG. 8 is a schematic diagram of an example infrastructure processing unit (IPU).

In the illustrated example of FIG. 1, the compute platform 105A includes one or more example central processing units (CPUs) 110A (collectively referred to as example CPU(s) 110A), one or more example memories 115A (collectively referred to as example memory 115A) and an example IPU 120A. Likewise, the compute platform 105B includes one or more example CPUs 110B (collectively referred to as example CPU(s) 110B), one or more example memories 115B (collectively referred to as example memory 115B) and an example IPU 120B. Likewise, the compute platform 105C includes one or more example CPUs 110C (collectively referred to as example CPU(s) 110C), one or more example memories 115B (collectively referred to as example memory 115C) and an example IPU 120C. Likewise, the compute platform 105D includes one or more example CPUs 110D (collectively referred to as example CPU(s) 110D), one or more example memories 115D (collectively referred to as example memory 115D) and an example IPU 120D. Example implementations of the CPU(s) 110A-D are described in connection in FIGS. 11, 13 and 14, which are described in further detail below. Example implementations of the memories 115A-D are described in connection with FIG. 11, which is described in further detail below. An example implementation of the IPUs 120A-D is illustrated in FIG. 8, which is described in further detail below.

In the illustrated example of FIG. 1, example services 125A-D are deployed to respective ones of the compute platforms 105A-D for execution by the CPU(s) 110A-D of those compute platforms 105A-D. For example, the service 125A is deployed to the compute platform 105A for execution by its CPU(s) 110A, the service 125B is deployed to the compute platform 105B for execution by its CPU(s) 110B, the service 125C is deployed to the compute platform 105C for execution by its CPU(s) 110C, and the service 125D is deployed to the compute platform 105D for execution by its CPU(s) 110D. In some examples, the services 125A-D are microservices that are chained to implement an application. For example, the service 125A can implement a video decoder service, the service 125B can implement a video filtering service, the service 125C can implement an image composing service, and the service 125D can implement an object and event detection service, which can be chained to implement a vehicular traffic monitoring application, as described above. In some examples, the services 125A-D can correspond to different instances of the same service. For example, services 125A and 125B could correspond to two different instances of the video decoder service, and services 125C and 125D could correspond to two different instances of the video filtering service.

In the illustrated example of FIG. 1, each of the IPUs 120A-D include respective example failover circuitry 130A-D. For example, the IPU 120A includes the failover circuitry 130A, the IPU 120B includes the failover circuitry 130B, the IPU 120C includes the failover circuitry 130C and the IPU 120D includes the failover circuitry 130D. The failover circuitry 130A-D is included in the respective IPUs 120A-D to implement service failover in accordance with teachings of this disclosure. For example, the failover circuitry 130A-D monitors the different services and associated service requests executing on the different compute platforms 105A-D to ensure the services are making forward progress and, if not, perform service failover to avoid stale and/or duplicate service responses, inconsistent service states, etc.

For example, when a new service, such as service 1 (125A), is deployed to the compute platform 105A, software (e.g., an orchestrator, an operating system, etc.) causes the CPU(s) 110A to notify the IPU 120A that the new service 1 (125A) is available and register the service 1 (125A) with the failover circuitry 130A of the IPU 120A for failover protection. After registration is complete, the failover circuitry 130A of the IPU 120A causes the compute platform 105A to notify its peers (e.g., the other compute platforms 105B-D) in the compute infrastructure 100 that service 1 (125A) is available at the compute platform 105A. For example, such notifications can be communicated to the compute platforms 105A-D via an example switch 135 interconnecting the compute platforms 105A-D The switch 135 of the illustrated example can be implemented by one or more switches, routers, gateways, servers, etc. Through such notifications, the failover circuitry 130B-D of the IPUs 120B-D of the respective compute platforms 105A-D becomes aware of the availability of service 1 (125A) on the compute platform 105A.

After the compute platform 105A broadcasts the availability of service 1 (125A), the requests for execution associated with service 1 (125A) may arrive at the compute platform 105A. If such a service request is received at the compute platform 105A, the failover circuitry 130A of the IPU 120A tracks the service request by monitoring the status of execution of service 1 (125A) (or, in some examples, the status of the execution of the service request by the service 1 (125A)) on the compute platform 105A. If the failover circuitry 130A of the IPU 120A detects a failure condition associated with execution of service 1 (125A) (e.g., such as the service 1 (125A) becoming unresponsive, the compute platform 105A entering a reboot state or a high load state, etc.), the failover circuitry 130A implements service failover by, for example, forwarding the service request to another one of the compute platforms 105B-D at which another instance of service 1 is deployed, and discarding late responses that may be returned by service 1 (125A) if/when the service resumes execution on the compute platform 105A, etc. In some examples, the failover circuitry 130A of the IPU 120A cooperates with the switch 135 to implement further service failover operations, as disclosed in detail below.

Figure 2:
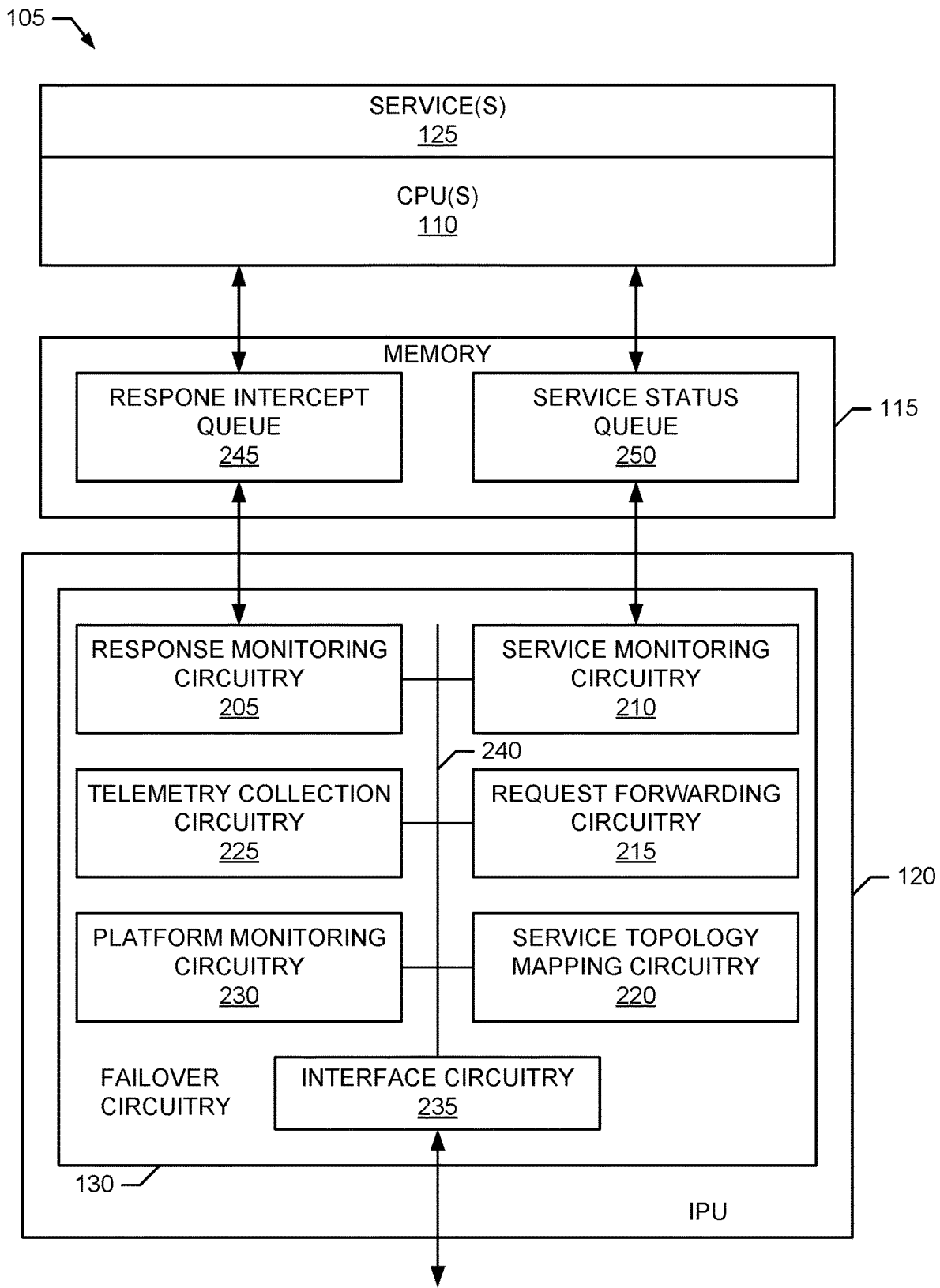
FIG. 2 is a block diagram illustrating an example implementation of one of the compute platforms of FIG. 1.

A more detailed block diagram of an example implementation of an example compute platform 105, which may be used to implement respective ones of the compute platforms 105A-D of FIG. 1, is illustrated in FIG. 2. As such, the compute platform 105 can correspond to any type(s) of compute platforms, such as, but not limited to, one or more server platforms of a cloud computing infrastructure, one or more edge nodes of an edge computing infrastructure, one or more base stations of a mobile communication infrastructure, etc. One or more elements of the computer platform 105 of FIG. 2 may be instantiated (e.g., creating an instance of, bring into being for any length of time, materialize, implement, etc.) by processor circuitry such as a central processing unit executing instructions. Additionally or alternatively, one or more of the elements of the computer platform 105 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The example compute platform 105 of FIG. 2 includes one or more example CPUs 110 (collectively referred to as example CPU(s) 110), which may be used to implement respective ones of the CPU(s) 110A-D of FIG. 1. In the illustrated example of FIG. 2, one or more example services 125 (collectively referred to as service(s) 125) are deployed to the compute platform 105 for execution by the CPU(s) 110. As such, the service(s) 125 can correspond to respective ones of the service(s) 125A-D of FIG. 1. The example compute platform 105 of FIG. 2 also includes one or more example memories 115 (collectively referred to as example memory 115), which may be used to implement respective ones of the memories 115A-D of FIG. 1. The example compute platform 105 of FIG. 2 further includes an example IPU 120, which may be used to implement respective ones of the IPUs 120A-D of FIG. 1. In the illustrated example of FIG. 2, the IPU 120 includes example failover circuitry 130, which may be used to implement respective ones of the failover circuitry 130A-D of FIG. 1. Example implementations of the CPU(s) 110 are described in connection in FIGS. 11, 13 and 14, which are described in further detail below. Example implementations of the memory 115 are described in connection with FIG. 11, which is described in further detail below. An example implementation of the IPU 120 is illustrated in FIG. 8, which is described in further detail below.

In the illustrated example of FIG. 2, the failover circuitry 130 includes example response monitoring circuitry 205, example service monitoring circuitry 210, example request forwarding circuitry 215, example service topology mapping circuitry 220, example telemetry collecting circuitry 225, example platform monitoring circuitry 230 and example interface circuitry 235, which are connected, communicatively coupled or otherwise in communication via an example bus 240. The bus 240 can be implemented by any number and/or type(s) of bus circuitry, communication links, wires, pins, function calls, message interfaces, etc. In the illustrated example of FIG. 2, the memory 140 includes an example response intercept queue 245 and an example service status queue 250. Operation of the response monitoring circuitry 205, the service monitoring circuitry 210, the request forwarding circuitry 215, the service topology mapping circuitry 220, the telemetry collecting circuitry 225, the platform monitoring circuitry 230, the interface circuitry 235, the response intercept queue 245 and the service status queue 250 is described in detail below.

In the illustrated example of FIG. 2, the CPU(s) 110 notify the IPU 120 when a new service 125 is deployed to the compute platform 105 by providing registration information for the service 125 to the service topology mapping circuitry 220 via the interface circuitry 235. The service topology mapping circuitry 220 stores the registration information associated with the service 125 for failover processing, as described in further detail below. The service topology mapping circuitry 220 also uses the registration information to broadcast the availability of the service 125 on the compute platform 105 to other compute platforms in the compute infrastructure 100. The service topology mapping circuitry 220 further receives, via the interface circuitry 235, broadcasts from other compute platforms in the compute infrastructure 100 that include registration information for services deployed on those other compute platforms, which may include services different from the service 125 (e.g., such as other microservices included in a chain implementing a given application), and/or other instances of the same service 125, etc.

In some examples, the failover circuitry 130 of the IPU 120 operates to track service requests that arrive at the compute platform 105, detect failure conditions associated with execution of the services corresponding to the service requests, and discard late and/or duplicate responses from such services after a failure condition is detected. For example, assume that a request for a service 125 arrives at the compute platform 105 (e.g., from another compute platform or other originator of the request) and is forwarded (e.g., by an orchestrator, an operating system, etc., executing on CPU(s) 110) to the IPU 120 (e.g., via the interface circuitry 235). Furthermore, assume that the request is associated with a service level objective (SLO) specified for execution of the service 125 (or, in some examples, specified for execution of the service request by the service 125). For example, the SLO may specify a target completion time, target resource usage (e.g., CPU cycles, memory, etc.), etc. In some examples, the request forwarding circuitry 215 of the IPU 120 uses the SLO associated with the request to determine whether the request should stay with the compute platform 105 or be forwarded to another compute platform at which another instance of the service 125 is deployed. For example, the request forwarding circuitry 215 may evaluate performance characteristics of the compute platform 105 that are obtained by the telemetry collection circuitry 225 of the IPU 120 to determine whether execution of the service 125 by the local compute platform 105 (or, in some examples, whether execution of the service request by the service 125 on the local compute platform 105) is likely to satisfy the SLO specified in the request. Such telemetry can include, but is not limited to, CPU utilization, memory utilization, temperature, energy usage, network throughput, etc., of the compute platform 105 as measured or otherwise collected by the telemetry collection circuitry 225.

In some examples, if the forwarding circuitry 215 determines that the local compute platform 105 is unlikely to satisfy the SLO specified in the request for service 125, the request forwarding circuitry 215 determines whether the request should be forwarded to another compute note at which the service topology mapping circuitry 220 determined another instance of the service 125 is deployed. For example, the telemetry collection circuitry 225 may obtain performance characteristics (via the interface circuitry 235 and the switch 135, as disclosed in further detail below) from other compute platforms at which other instances of the service 125 are deployed. In some such examples, the request forwarding circuitry 215 evaluates the reported performance characteristics of other compute platform(s) at which instance(s) of the service 125 are deployed to identify one of those compute platforms that is likely to satisfy the SLO specified in the request. The request forwarding circuitry 215 then forwards (e.g., via the interface circuitry 235) the request for the service 125 to that other identified compute platform that is likely to meet the SLO associated with the request.

However, if the request forwarding circuitry 215 determines that the request for the service 125 is to stay with the local compute platform 105, the failover circuitry 130 of the IPU 120 operates to monitor the lifecycle of the service request. In the illustrated example, the service monitoring circuitry 210 utilizes the service status queue 250 as a dedicated region of the memory 115 in which services can update the status of their execution and, thus, update the state of their associated service requests. As such, in the illustrated example, a service, such as the service 125, is responsible for updating a specified region of the memory 115 (e.g., a specified entry in the service status queue 250) with the status of its execution, which can be used by the IPU 120 to determine a state of the request associated with that service.

For example, once the request for the service 125 is accepted by the request forwarding circuitry 215 for execution by the compute platform 105, the service monitoring circuitry 210 of the IPU 120 allocates a monitoring entry for that service request in the service status queue 250, and returns (e.g., via the interface circuitry 235) a memory pointer to the allocated monitoring entry to the service 125 (e.g., via the interface circuitry 235). (Although the service status queue 250 is included in shared memory 115 in the illustrated example, in other examples, the service status queue 250 may be local to the IPU 120 and accessible by the service 125 via Compute Express Link™ or some other connection protocol.) In some such examples, the service 125 uses the provided memory pointer to update its monitoring entry in the service status queue 250 with the status of its execution. For example, the status update may be in the form of a percentage of forward progress towards completion and/or any other key performance indicator (KPI) (e.g., such as estimated completion time, energy used, throughput, etc.). In some examples, the service 125 uses the provided memory pointer to return a service response, which indicates execution of the service 125 (or, in some examples, execution of the service request by the service 125) has completed, to the monitoring entry in the service status queue 250. In the illustrated example, the service monitoring circuitry 210 translates the updated status in the monitoring entry in the service status queue 250 to a monitored state of the request associated with the service 125. For example, the service monitoring circuitry 210 can translate the updated status of the service 125 to one or more of the following states of the request: request in progress, request complete, request stalled, request SLO unlikely to be met, etc.) The service monitoring circuitry 210 further monitors the state of the service request associated with the service 125 to detect a failure condition associated with execution of the service 125. For example, the service monitoring circuitry 210 may detect a failure condition when the request state is determined to be stalled (e.g., because the reported percentage of forward progress and/or estimated completion time remain unchanged for at least a threshold duration of time), indicates the request SLO unlikely to be met (e.g., because the estimated completion time exceeds the SLO), etc.

If the service monitoring circuitry 210 detects a failure condition associated with execution of the service 125 (e.g., a failure condition associated with the corresponding service request), the request forwarding circuitry 215 performs service failover by identifying another compute platform at which another instance of the service 125 is deployed, and forwarding the request for service 125 to that identified compute platform. For example, the request forwarding circuitry 215 can identify another compute platform by evaluating the reported performance characteristics of the other compute platform(s) at which instance(s) of the service 125 are deployed to identify one of those compute platforms that is likely to satisfy the SLO specified in the request, as described above. In the illustrated example, the response monitoring circuitry 205 of the IPU 120 also performs service failover by monitoring the status of the original request associated with execution of the service 125 on the local compute platform 105 to confirm that the original request continues to not make forward progress or, if it does resume making forward progress, intercept and discard any response from the service 125, as follows (thereby preventing a duplicate response from the service 125 after the service request has been forwarded to another compute platform).

For example, the response monitoring circuitry 205 adds the failed request to the response intercept queue 245. In some examples, adding a failed request to the response intercept queue 245 causes a response associated with that request to be intercepted (e.g., from the associated entry in the service status queue 250) and stored in an entry of the response intercept queue 245 that is linked to the failed request. The response monitoring circuitry 205 then monitors the response intercept queue 245 for a response from the service 125 that is associated with the failed request (e.g., such as a response that includes the same request identifier and/or service identifier associated with the failed request). If a response to the failed request is detected in the response intercept queue 245, the response monitoring circuitry 205 discards the response from the response intercept queue 245, which causes the response to not be forwarded to the compute platform or other originator of the service request.

In some examples, the platform monitoring circuitry 230 monitors the performance characteristics obtained by the telemetry collection circuitry 225 for the compute platform 105 to detect a failure condition associated with execution of the service 125. For example, the platform monitoring circuitry 230 may monitor and compare the platform's CPU utilization, memory utilization, temperature, energy usage, etc., to one or more thresholds that, if met or exceeded, indicate the SLO specified in the request associated with the service 125 is unlikely to be met. In some examples, if one or more of the performance characteristic thresholds is/are met or exceeded, the platform monitoring circuitry 230 detects a failure condition associated with the service 125, which triggers the IPU 120 to perform service failover, as described above.

In some examples, the platform monitoring circuitry 230 additionally or alternatively monitors or otherwise inspects the networking layer and/or higher layer packet headers transmitted and/or received by the compute platform 105 to determine whether delivery of service requests and/or responses are being delayed by out-of-order packets, packet loss, congestion, etc. In some examples, for higher layer packet inspection, an application or service can share header definition (e.g., defined in the programming protocol-independent packet processors (P4) programming language and/or some other programming language) with a network interface controller (NIC) of the compute platform 105, which in turn, can cause the platform monitoring circuitry 230 of the IPU 120 to install match-action rules to parse packet headers and collect network telemetry information, such as, whether fragmented request and/or response packets have been received, etc. Such network telemetry information can be used by the platform monitoring circuitry 230 to determine whether the service 125 has failed or is unable to meet its specified SLO due to a networking problem. In some examples, if a networking problem is detected, failover logic in the interface circuitry 235 of the IPU 120 may decide to use an alternate path to communicate with the other services in the chain forming the application (e.g., instead of moving the service altogether to another compute platform).

In some examples, the IPU 120 utilizes one or more mechanisms to ensure that access to the response intercept queue 245 and/or the service status queue 250 in the memory 115 is limited to authorized service(s) 125, thereby ensuring that contents of the response intercept queue 245 and/or the service status queue 250 are not corrupted. In some examples, the IPU 120 implements a first example mechanism via which IPU 120 validates a service, such as the service 125 described above, when the service 125 attempts to write/store a status update to the service status queue 250. In some such examples, the service 125 provides a certificate when the service 125 is initially deployed to the compute platform 105, and the service topology mapping circuitry 220 stores this certificate in association with that service 125. Then, when the service 125 writes/stores a status update to the service status queue 250, the service 125 signs the status update with its certificate. In such examples, the service monitoring circuitry 210 uses the stored certificate associated with the service 125 to validate the signature of the status update. If the signature is valid, the service monitoring circuitry 210 validates the status update and retains it in the service status queue 250. However, if the signature is not valid, the service monitoring circuitry 210 the service monitoring circuitry 210 generates an error interrupt on the compute platform 105 and/or sends a notification to a control plane of the compute infrastructure 100 to indicate that an anomaly (e.g., a bug, a malicious service, etc.) has been detected.

In some examples, the IPU 120 additionally or alternatively implements a second example mechanism in which regions (s) of the memory 115 utilized for the response intercept queue 245 and/or the service status queue 250 reside in protected memory regions associated with a trusted domain of the service(s) 125. In some such examples, the integrity of the response intercept queue 245 and/or the service status queue 250 is automatically protected by the trust mechanisms (e.g., Intel® Trust Domain Extensions (Intel® TDX), etc.) used to implement the trusted domain.

Figure 3:
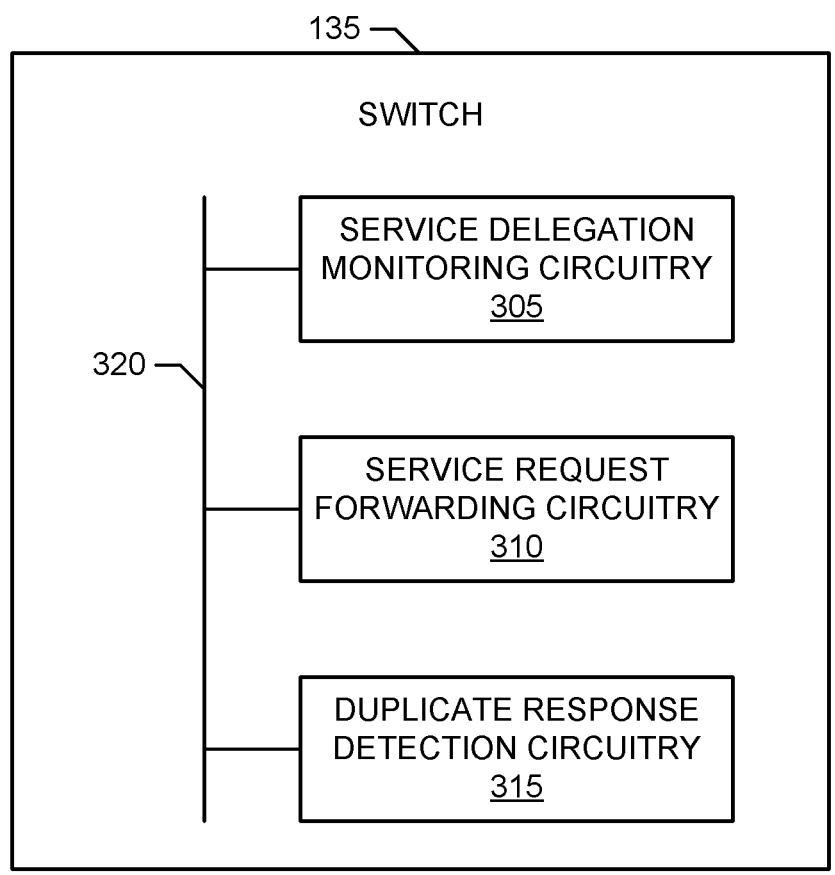
FIG. 3 is a block diagram illustrating an example implementation of the switch of FIG. 1.

In some examples, the IPU 120 of FIG. 2 implements the service failover operations described above, but also operates in conjunction with the switch 135 to proactively reduce the likelihood of a service request failure. Such a proactive feature can be beneficial in time critical applications in which the time associated rehoming a service during service failure is not tolerable. An example implementation of the switch 135 of FIG. 1, which supports such proactive service failover as disclosed herein, is illustrated in FIG. 3. One or more elements of the example switch 135 of FIG. 3 may be instantiated (e.g., creating an instance of, bring into being for any length of time, materialize, implement, etc.) by processor circuitry such as a central processing unit executing instructions. Additionally or alternatively, one or more of the elements of the example switch 135 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

The example switch 135 of FIG. 3 includes example service delegation monitoring circuitry 305, example service request forwarding circuitry 310 and example duplicate response detection circuitry 315, which are connected, communicatively coupled or otherwise in communication via an example bus 320. The bus 320 can be implemented by any number and/or type(s) of bus circuitry, communication links, wires, pins, function calls, message interfaces, etc. Operation of the service delegation monitoring circuitry 305, the service request forwarding circuitry 310 and the duplicate response detection circuitry 315 is described in the context of the following description of proactive service failover.

With reference to FIGS. 2 and 3, in some examples in which proactive service failover is implemented in accordance with teachings of this disclosure, in response to a request for a service, such as the service 125, the IPU 120 triggers multiple instances of the service 125 to be executed on multiple compute platforms, which may or may not include the local compute platform 105. For example, the SLO provided with the request for the service 125 may specify a priority of the service 125. When evaluating, the SLO against the performance characteristics of compute platforms hosting the instances of the service 125, the request forwarding circuitry 215 determines the likelihood of the SLO being met by the local compute platform 105 and/or the other platforms hosting instances of the service 125. If the request forwarding circuitry 215 determines the SLO is unlikely to be met by the compute platforms, and service's priority is sufficiently high (e.g., at or above a priority threshold), the request forwarding circuitry 215 can select multiple compute platforms (which may or may not include the local compute platform 105). For example, if there are four (4) compute platforms that host instances of the service 125, the request forwarding circuitry 215 may select and forward the request to three (3) of those compute platforms depending on evaluation of the SLO against the performance characteristics of those compute platforms. In some examples, the request forwarding circuitry 215 of the IPU 120 forwards a single service request identifying the multiple target compute platforms to the service request forwarding circuitry 310 of the switch 135, which replicates and forwards a separate service request to each of the target compute platforms.

In some examples, the duplicate response detection circuitry 315 of the switch monitors for duplicate service responses resulting from the request for service 125 being forwarded to multiple compute platforms. In some such examples, the duplicate response detection circuitry 315 allows the earliest detected service response to proceed, and forwards the response to the compute platform (or other service originator) that originated the request. However, subsequent responses that are detected from other compute platforms executing instances of the service 125 are discarded by the duplicate response detection circuitry 315 to avoid inconsistent service states and/or other error conditions from occurring. In some examples, the duplicate response detection circuitry 315 also performs duplicate service response detection and discarding to support compute platforms with IPUs that do not implement local service failover as described above. For example, assume such an IPU detects a failure condition associated with a service executing on its local compute platform, and forwards the service request to a second compute platform hosting another instance of that service. If the IPU does not locally monitor for and discard responses from the failed service executing on the local compute platform (which may be generated if the failed response later resumes, as described above), the duplicate response detection circuitry 315 of the switch may detect this duplicate response and discard it, thereby preventing the errant response from being forwarded to the service originator. In some examples, to enable the duplicate response detection circuitry 315 to monitor for such duplicate response, IPUs notify the server request forwarding circuitry 310 of the switch 135 whenever a service request is forwarded from one compute platform to another compute platform in the compute infrastructure 100.

In some examples, the service delegation monitoring circuitry 305 of the switch 135 monitors the compute platforms in the compute infrastructure 100 and how services are executing on those compute platforms, and propagates this information among the compute platforms for use in making service failover decisions, as described above. For example, the service delegation monitoring circuitry 305 may collect the performance characteristics described above for the compute platforms 105A-D in the compute infrastructure 100 and propagate those performance characteristics among the compute platforms. In this way, rather than requiring each compute platform 105A-D to individually query all the other compute platform 105A-D for their respective performance characteristics, the service delegation monitoring circuitry 305 can monitor the performance characteristics of the compute platforms 105A-D and, if a change is detected, propagate the change among the compute platforms 105A-D. In this way, the IPU 120A-D of a given compute platform 105A-D has access to up-to-date performance characteristics for each of the compute platforms 105A-D when performing service failover, as described above.

In examples disclose above, each IPU 120A-D performs service failover locally for its respective compute platform 105A-D. However, in some examples, IPUs on different compute nodes may collaborate to perform service failover. For example, when multiple services (microservices) in a chain forming an application are under failure (e.g., corresponding to a correlated failure), the IPUs in the chain can collaboratively determine whether the services (e.g., both failed and intact ones) within the chain should be relocated as a group to new compute platforms in order to meet one or more end-to-end SLOs.

Figure 4:
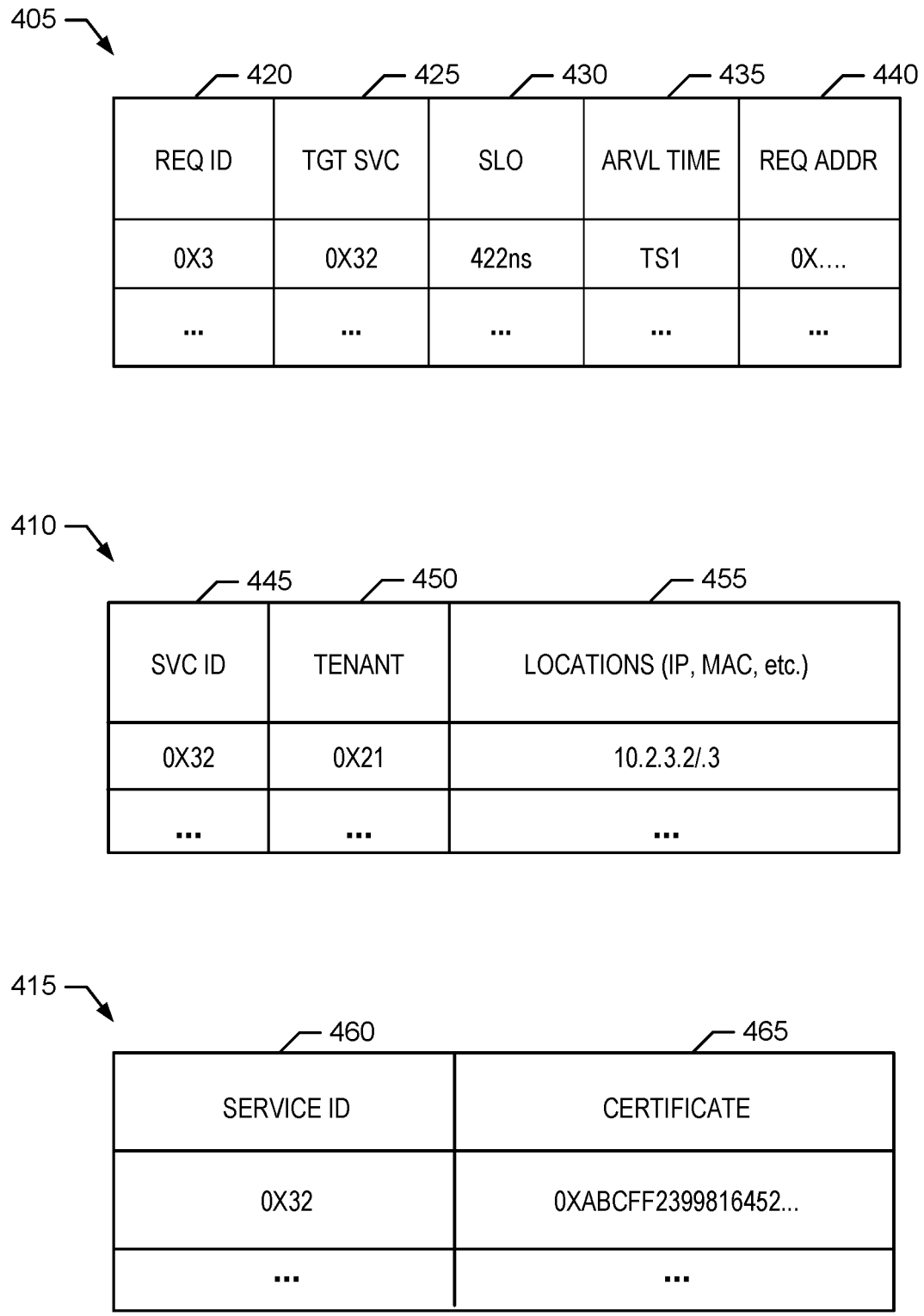
FIG. 4 illustrates example information elements utilized by the compute platforms of FIGS. 1 and/or 2 to perform service failover in accordance with teachings of this disclosure.

FIG. 4 illustrates example information elements utilized by the example compute platforms 105A-D of FIG. 1 and/or the compute platform 105 of FIG. 2 to perform service failover in accordance with teachings of this disclosure. For example, FIG. 4 illustrates an example service request information element 405, an example service discovery information element 410 and an example service registration information element 415. In some examples, the service request information element 405 is used to implement a service request, as disclosed herein. The service request information element 405 of the illustrated example includes an example request identifier field 420 to identify the request, an example target service field 425 specifying an identifier of the service to be executed, an example SLO field 430 specifying one or more SLOs to be met when the service identified in the target service field 425 is executed, an example arrival time field 435 that is timestamped by a recipient of the request, and an example request address field 440 specifying an address of the originator of the request. In some examples, a corresponding service response that is generated responsive to a service request implemented by the service request information element 405 includes the request identifier specified in the request identifier field 420 and is sent to the address specified in the request address field 440.

In some examples, the service discovery information element 410 is used by IPUs 120A-D and/or 120 to broadcast service discovery information when a new service is deployed, and/or is used by the switch 135 to propagate service topology information among the IPUs 120A-D and/or 120 in the compute infrastructure 100. The service discovery information element 410 of the illustrated example includes an example service identifier field 445 specifying an identifier of a service, an example tenant field 450 specifying a tenant identifier corresponding to the compute platform on which the service identified by the service identifier field 445 is deployed, and an example location field specifying an address and/or other location identifier of the compute platform on which the service identified by the service identifier field 445 is deployed.

In some examples, the service registration information element 415 is used by the IPUs 120A-D and/or 120 to register a service with a compute platform. The service registration information element 415 of the illustrated example includes an example service identifier field 460 specifying an identifier of a service, and an example certificate field 465 including a digital certificate associated with the service identified by the service identifier field 460.

In some examples, the IPU 120 includes means monitoring for service responses. For example, the means for monitoring for service responses may be implemented by the response monitoring circuitry 205. In some examples, the response monitoring circuitry 205 may be instantiated by processor circuitry such as the example processor circuitry 1112 of FIG. 11. For instance, the response monitoring circuitry 205 may be instantiated by the example general purpose processor circuitry 1300 of FIG. 13 executing machine executable instructions such as that implemented by blocks of FIGS. 9A-B and/or 10A-C. In some examples, the response monitoring circuitry 205 may be instantiated by hardware logic circuitry, which may be implemented by an ASIC or the FPGA circuitry 1400 of FIG. 14 structured to perform operations corresponding to the machine readable instructions. Additionally or alternatively, the response monitoring circuitry 205 may be instantiated by any other combination of hardware, software, and/or firmware. For example, the response monitoring circuitry 205 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the IPU 120 includes means monitoring services. For example, the means for monitoring services may be implemented by the service monitoring circuitry 210. In some examples, the service monitoring circuitry 210 may be instantiated by processor circuitry such as the example processor circuitry 1112 of FIG. 11. For instance, the service monitoring circuitry 210 may be instantiated by the example general purpose processor circuitry 1300 of FIG. 13 executing machine executable instructions such as that implemented by blocks of FIGS. 9A-B and/or 10A-C. In some examples, the service monitoring circuitry 210 may be instantiated by hardware logic circuitry, which may be implemented by an ASIC or the FPGA circuitry 1400 of FIG. 14 structured to perform operations corresponding to the machine readable instructions. Additionally or alternatively, the service monitoring circuitry 210 may be instantiated by any other combination of hardware, software, and/or firmware. For example, the service monitoring circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the IPU 120 includes means for forwarding service requests. For example, the means for forwarding service requests may be implemented by the request forwarding circuitry 215. In some examples, the request forwarding circuitry 215 may be instantiated by processor circuitry such as the example processor circuitry 1112 of FIG. 11. For instance, the request forwarding circuitry 215 may be instantiated by the example general purpose processor circuitry 1300 of FIG. 13 executing machine executable instructions such as that implemented by blocks of FIGS. 9A-B and/or 10A-C. In some examples, the request forwarding circuitry 215 may be instantiated by hardware logic circuitry, which may be implemented by an ASIC or the FPGA circuitry 1400 of FIG. 14 structured to perform operations corresponding to the machine readable instructions. Additionally or alternatively, the request forwarding circuitry 215 may be instantiated by any other combination of hardware, software, and/or firmware. For example, the request forwarding circuitry 215 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the IPU 120 includes means for performing service topology mapping. For example, the means for performing service topology mapping may be implemented by the service topology mapping circuitry 220. In some examples, the service topology mapping circuitry 220 may be instantiated by processor circuitry such as the example processor circuitry 1112 of FIG. 11. For instance, the service topology mapping circuitry 220 may be instantiated by the example general purpose processor circuitry 1300 of FIG. 13 executing machine executable instructions such as that implemented by blocks of FIGS. 9A-B and/or 10A-C. In some examples, the service topology mapping circuitry 220 may be instantiated by hardware logic circuitry, which may be implemented by an ASIC or the FPGA circuitry 1400 of FIG. 14 structured to perform operations corresponding to the machine readable instructions. Additionally or alternatively, the service topology mapping circuitry 220 may be instantiated by any other combination of hardware, software, and/or firmware. For example, the service topology mapping circuitry 220 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the IPU 120 includes means for collecting telemetry. For example, the means for collecting telemetry may be implemented by the telemetry collecting circuitry 225. In some examples, the telemetry collecting circuitry 225 may be instantiated by processor circuitry such as the example processor circuitry 1112 of FIG. 11. For instance, the telemetry collecting circuitry 225 may be instantiated by the example general purpose processor circuitry 1300 of FIG. 13 executing machine executable instructions such as that implemented by blocks of FIGS. 9A-B and/or 10A-C. In some examples, the telemetry collecting circuitry 225 may be instantiated by hardware logic circuitry, which may be implemented by an ASIC or the FPGA circuitry 1400 of FIG. 14 structured to perform operations corresponding to the machine readable instructions. Additionally or alternatively, the telemetry collecting circuitry 225 may be instantiated by any other combination of hardware, software, and/or firmware. For example, the telemetry collecting circuitry 225 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the IPU 120 includes means for monitoring a compute platform. For example, the means for monitoring a compute platform may be implemented by the platform monitoring circuitry 230. In some examples, the platform monitoring circuitry 230 may be instantiated by processor circuitry such as the example processor circuitry 1112 of FIG. 11. For instance, the platform monitoring circuitry 230 may be instantiated by the example general purpose processor circuitry 1300 of FIG. 13 executing machine executable instructions such as that implemented by blocks of FIGS. 9A-B and/or 10A-C. In some examples, the platform monitoring circuitry 230 may be instantiated by hardware logic circuitry, which may be implemented by an ASIC or the FPGA circuitry 1400 of FIG. 14 structured to perform operations corresponding to the machine readable instructions. Additionally or alternatively, the platform monitoring circuitry 230 may be instantiated by any other combination of hardware, software, and/or firmware. For example, the platform monitoring circuitry 230 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the IPU 120 includes means for interfacing. For example, the means for interfacing may be implemented by the interface circuitry 235. In some examples, the interface circuitry 235 may be instantiated by processor circuitry such as the example processor circuitry 1112 of FIG. 11. For instance, the interface circuitry 235 may be instantiated by the example general purpose processor circuitry 1300 of FIG. 13 executing machine executable instructions such as that implemented by blocks of FIGS. 9A-B and/or 10A-C. In some examples, interface circuitry 235 may be instantiated by hardware logic circuitry, which may be implemented by an ASIC or the FPGA circuitry 1400 of FIG. 14 structured to perform operations corresponding to the machine readable instructions. Additionally or alternatively, the interface circuitry 235 may be instantiated by any other combination of hardware, software, and/or firmware. For example, the interface circuitry 235 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the IPUs 120A-D of FIG. 1 is illustrated by the example IPU 120 of FIG. 2, one or more of the elements, processes, and/or devices illustrated in FIG. 2 may be combined, divided, re-arranged, omitted, eliminated, and/or implemented in any other way. Further, the example response monitoring circuitry 205, the example service monitoring circuitry 210, the example request forwarding circuitry 215, the example service topology mapping circuitry 220, the example telemetry collecting circuitry 225, the example platform monitoring circuitry 230, the example interface circuitry 235 and/or, more generally, the example IPU 120 of FIG. 2, may be implemented by hardware alone or by hardware in combination with software and/or firmware. Thus, for example, any of the example response monitoring circuitry 205, the example service monitoring circuitry 210, the example request forwarding circuitry 215, the example service topology mapping circuitry 220, the example telemetry collecting circuitry 225, the example platform monitoring circuitry 230, the example interface circuitry 235 and/or, more generally, the example IPU 120 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example IPU 120 may include one or more elements, processes, and/or devices in addition to, or instead of, those illustrated in FIG. 2, and/or may include more than one of any or all of the illustrated elements, processes and devices.

In some examples, the switch 135 includes means for service and/or platform monitoring. For example, the means for service and/or platform monitoring may be implemented by the service delegation monitoring circuitry 305. In some examples, the service delegation monitoring circuitry 305 may be instantiated by processor circuitry such as the example processor circuitry 1212 of FIG. 12. For instance, the service delegation monitoring circuitry 305 may be instantiated by the example general purpose processor circuitry 1300 of FIG. 13 executing machine executable instructions such as that implemented by blocks of FIGS. 10A-C. In some examples, the service delegation monitoring circuitry 305 may be instantiated by hardware logic circuitry, which may be implemented by an ASIC or the FPGA circuitry 1400 of FIG. 14 structured to perform operations corresponding to the machine readable instructions. Additionally or alternatively, the service delegation monitoring circuitry 305 may be instantiated by any other combination of hardware, software, and/or firmware. For example, the service delegation monitoring circuitry 305 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the switch 135 includes means for forwarding service request. For example, the means for forwarding service requests may be implemented by the service request forwarding circuitry 310. In some examples, the service request forwarding circuitry 310 may be instantiated by processor circuitry such as the example processor circuitry 1212 of FIG. 12. For instance, the service request forwarding circuitry 310 may be instantiated by the example general purpose processor circuitry 1300 of FIG. 13 executing machine executable instructions such as that implemented by blocks of FIGS. 10A-C. In some examples, the service request forwarding circuitry 310 may be instantiated by hardware logic circuitry, which may be implemented by an ASIC or the FPGA circuitry 1400 of FIG. 14 structured to perform operations corresponding to the machine readable instructions. Additionally or alternatively, the service request forwarding circuitry 310 may be instantiated by any other combination of hardware, software, and/or firmware. For example, the service request forwarding circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the switch 135 includes means for detecting duplicate service responses. For example, the means for detecting duplicate service responses may be implemented by the duplicate response detection circuitry 315. In some examples, the duplicate response detection circuitry 315 may be instantiated by processor circuitry such as the example processor circuitry 1212 of FIG. 12. For instance, the duplicate response detection circuitry 315 may be instantiated by the example general purpose processor circuitry 1300 of FIG. 13 executing machine executable instructions such as that implemented by blocks of FIGS. 10A-C. In some examples, the duplicate response detection circuitry 315 may be instantiated by hardware logic circuitry, which may be implemented by an ASIC or the FPGA circuitry 1400 of FIG. 14 structured to perform operations corresponding to the machine readable instructions. Additionally or alternatively, the duplicate response detection circuitry 315 may be instantiated by any other combination of hardware, software, and/or firmware. For example, the duplicate response detection circuitry 315 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the switch 135 of FIG. 1 is illustrated in FIG. 3, one or more of the elements, processes, and/or devices illustrated in FIG. 3 may be combined, divided, re-arranged, omitted, eliminated, and/or implemented in any other way. Further, the example service delegation monitoring circuitry 305, the example service request forwarding circuitry 310, the example duplicate response detection circuitry 315 and/or, more generally, the example switch 135 of FIG. 3, may be implemented by hardware alone or by hardware in combination with software and/or firmware. Thus, for example, any of the example service delegation monitoring circuitry 305, the example service request forwarding circuitry 310, the example duplicate response detection circuitry 315 and/or, more generally, the example switch 135 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example switch 135 may include one or more elements, processes, and/or devices in addition to, or instead of, those illustrated in FIG. 3, and/or may include more than one of any or all of the illustrated elements, processes and devices.

Figure 5:
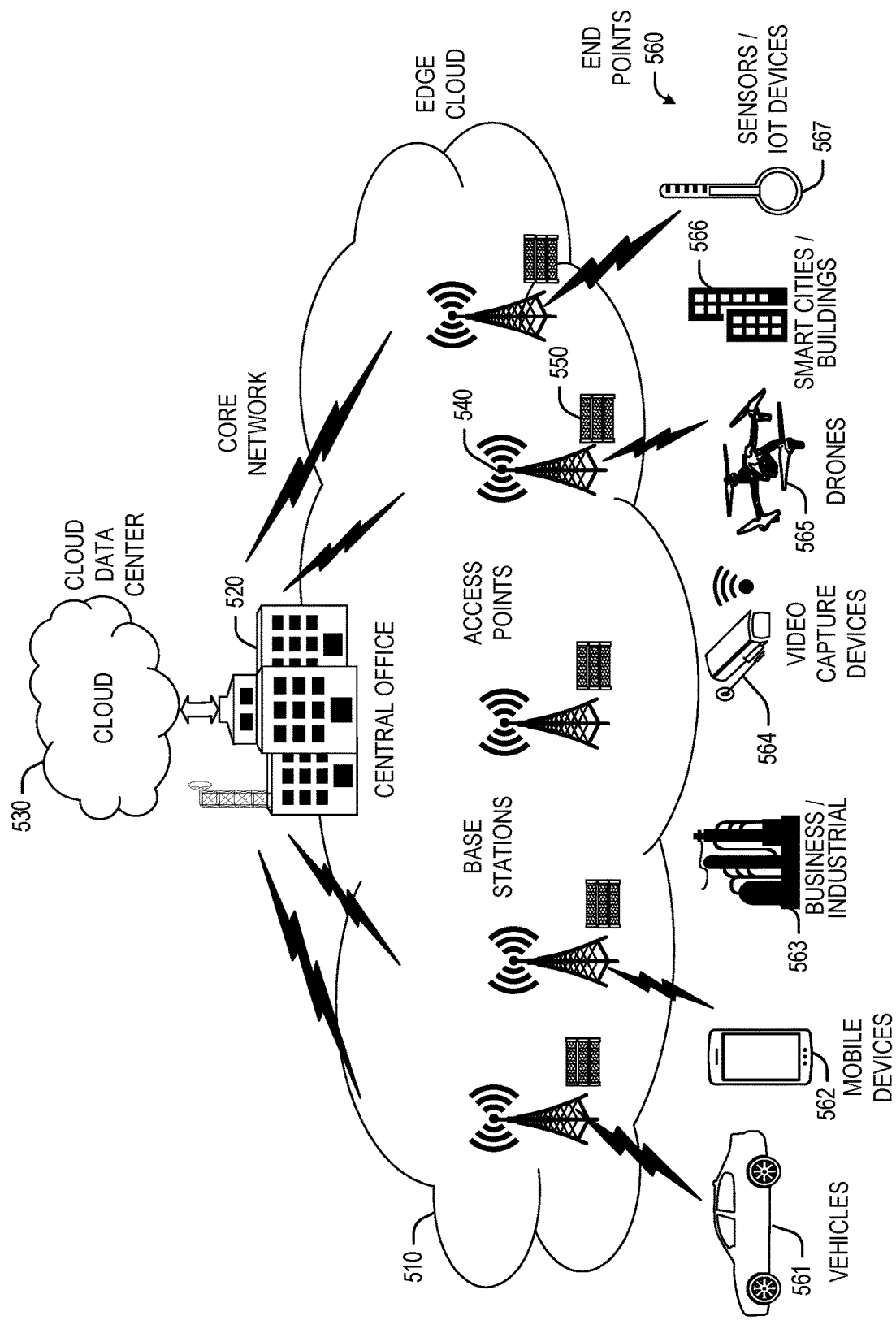
FIG. 5 illustrates an overview of an Edge cloud configuration for Edge computing.

FIG. 5 is a block diagram 500 showing an overview of a configuration for Edge computing, which includes a layer of processing referred to in many of the following examples as an "Edge cloud". As shown, the Edge cloud 510 is co-located at an Edge location, such as an access point or base station 540, a local processing hub 550, or a central office 520, and thus may include multiple entities, devices, and equipment instances. The Edge cloud 510 is located much closer to the endpoint (consumer and producer) data sources 560 (e.g., autonomous vehicles 561, user equipment 562, business and industrial equipment 563, video capture devices 564, drones 565, smart cities and building devices 566, sensors and IoT devices 567, etc.) than the cloud data center 530. Compute, memory, and storage resources which are offered at the edges in the Edge cloud 510 are critical to providing ultra-low latency response times for services and functions used by the endpoint data sources 560 as well as reduce network backhaul traffic from the Edge cloud 510 toward cloud data center 530 thus improving energy consumption and overall network usages among other benefits. In some examples, the compute infrastructure 100 corresponds to the Edge cloud 510. In some examples, the compute infrastructure 100 corresponds to the cloud data center 530.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate, or, bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture), such as one or more of the compute platforms 105A-D and/or 105, implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 6:
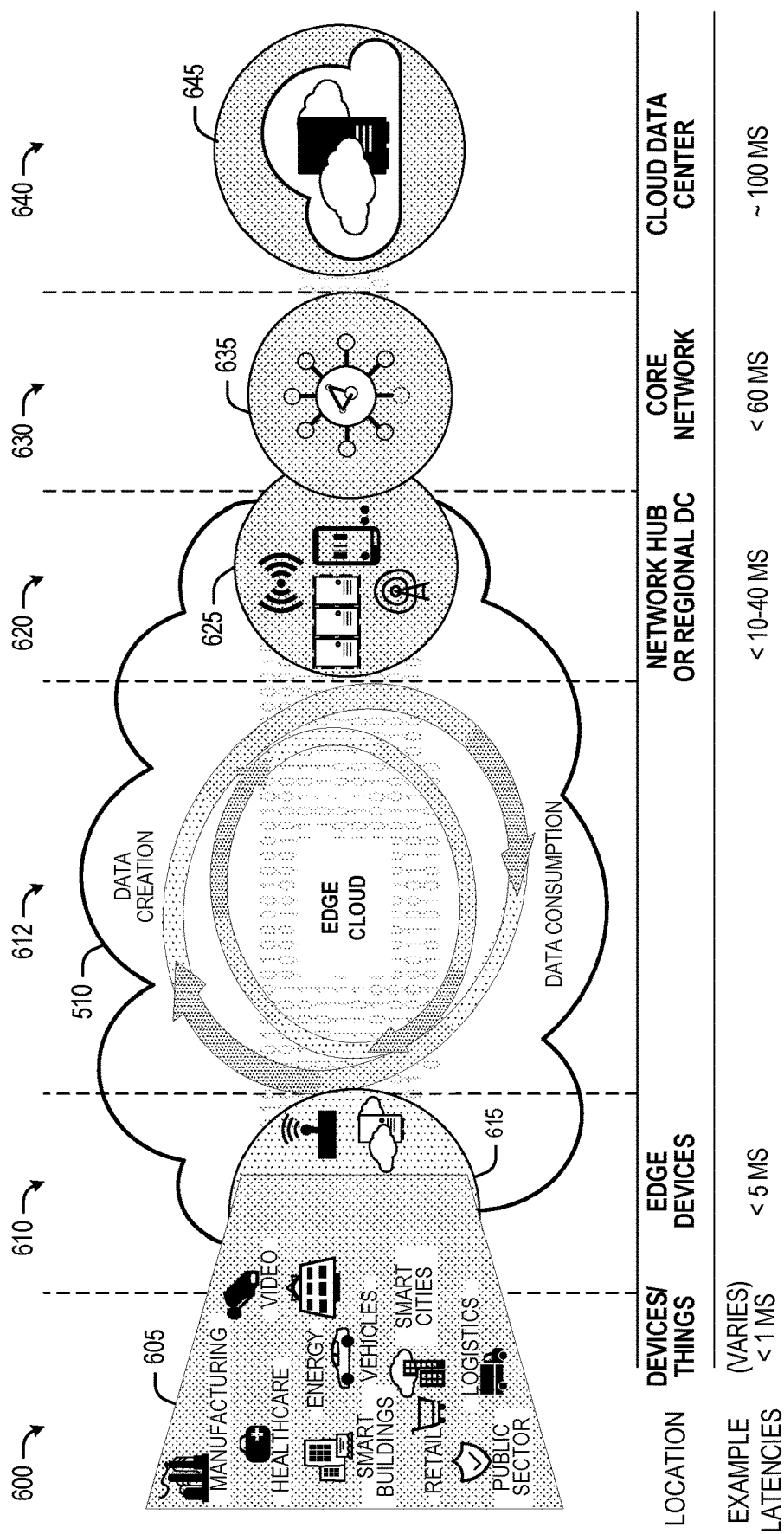
FIG. 6 illustrates operational layers among endpoints, an Edge cloud, and cloud computing environments.

FIG. 6 illustrates operational layers among endpoints, an Edge cloud, and cloud computing environments. Specifically, FIG. 6 depicts examples of computational use cases 605, utilizing the Edge cloud 510 among multiple illustrative layers of network computing. The layers begin at an endpoint (devices and things) layer 600, which accesses the Edge cloud 510 to conduct data creation, analysis, and data consumption activities. The Edge cloud 510 may span multiple network layers, such as an Edge devices layer 610 having gateways, on-premise servers, or network equipment (nodes 615) located in physically proximate Edge systems; a network access layer 620, encompassing base stations, radio processing units, network hubs, regional data centers (DC), or local network equipment (equipment 625); and any equipment, devices, or nodes located therebetween (in layer 612, not illustrated in detail). The network communications within the Edge cloud 510 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 600, under 5 ms at the Edge devices layer 610, to even between 10 to 40 ms when communicating with nodes at the network access layer 620. Beyond the Edge cloud 510 are core network 630 and cloud data center 640 layers, each with increasing latency (e.g., between 50-60 ms at the core network layer 630, to 100 or more ms at the cloud data center layer). As a result, operations at a core network data center 635 or a cloud data center 645, with latencies of at least 50 to 100 ms or more, will not be able to accomplish many time-critical functions of the use cases 605. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center 635 or a cloud data center 645, a central office or content data network may be considered as being located within a "near Edge" layer ("near" to the cloud, having high latency values when communicating with the devices and endpoints of the use cases 605), whereas an access point, base station, on-premise server, or network gateway may be considered as located within a "far Edge" layer ("far" from the cloud, having low latency values when communicating with the devices and endpoints of the use cases 605). It will be understood that other categorizations of a particular network layer as constituting a "close", "local", "near", "middle", or "far" Edge may be based on latency, distance, number of network hops, or other measurable characteristics, as measured from a source in any of the network layers 600-640.

The various use cases 605 may access resources under usage pressure from incoming streams, due to multiple services utilizing the Edge cloud. To achieve results with low latency, the services executed within the Edge cloud 510 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 510 may provide the ability to serve and respond to multiple applications of the use cases 605 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 510 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 510 (network layers 600-640), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 510.

As such, the Edge cloud 510 is formed from network components and functional features operated by and within Edge gateway nodes, Edge aggregation nodes, or other Edge compute nodes among network layers 610-630. The Edge cloud 510 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud 510 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks, etc.) may also be utilized in place of or in combination with such 3GPP carrier networks.

The network components of the Edge cloud 510 may be servers, multi-tenant servers, appliance computing devices, and/or any other type of computing devices, such as one or more of the compute platforms 105A-D and/or 105. For example, the Edge cloud 510 may include an appliance computing device that is a self-contained electronic device including one or more of the compute platforms 105A-D and/or 105 protected by a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings may include cooling and/or heating equipment to protect the appliance computing device (e.g., and one or more of the compute platforms 105A-D and/or 105 included therein) from hostile operating condition(s) (e.g., extreme heat, extreme cold), etc. Example housings for appliance computing devices that are structured to include multiple ones of the compute platforms 105A-D and/or 105 may also include one or more interconnects (e.g., one or more busses, communication links, network interfaces, etc.) to facilitate communication among (e.g., communicatively couple) the multiple compute platforms 105A-D and/or 105 to implement service failover, as disclosed above. In some such examples, the request and response messages sent among the multiple compute platforms 105A-D and/or 105 to implement service failover, as disclosed above, are communicated within the appliance computing device via the one or more data interconnects included in such housings (e.g., instead of, or in addition to, being communicated via switch 135). Example housings and/or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, rotors such as propellers, etc.) and/or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light-emitting diodes (LEDs), speakers, input/output (I/O) ports (e.g., universal serial bus (USB)), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. The Edge cloud 510 may also include one or more servers and/or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications and/or other software, code, or scripts may execute while being isolated from one or more other applications, software, code, or scripts.

Figure 7:
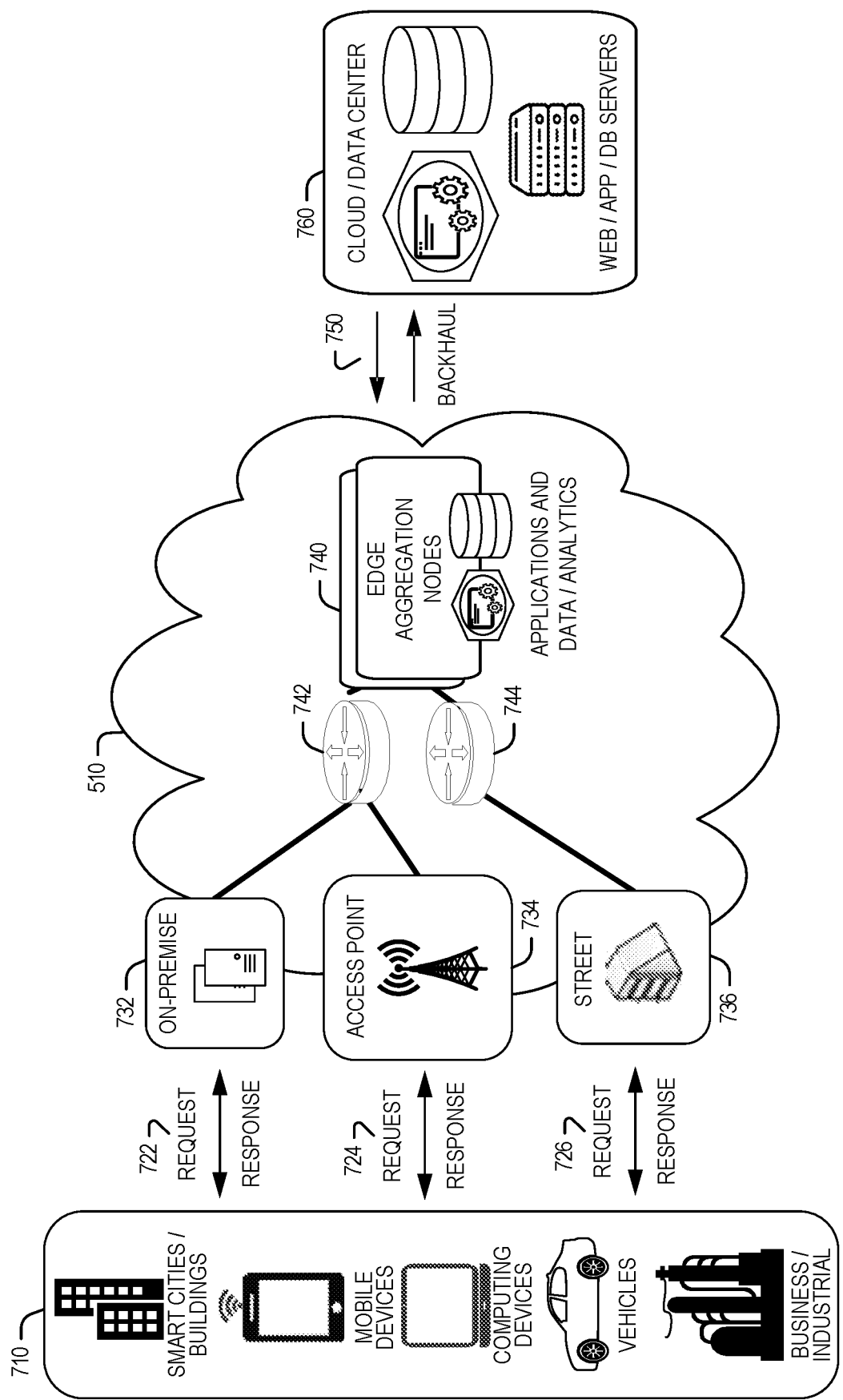
FIG. 7 illustrates an example approach for networking and services in an Edge computing system.

In FIG. 7, various client endpoints 710 (in the form of mobile devices, computers, autonomous vehicles, business computing equipment, industrial processing equipment) exchange requests and responses that are specific to the type of endpoint network aggregation. For instance, client endpoints 710 may obtain network access via a wired broadband network, by exchanging requests and responses 722 through an on-premise network system 732. Some client endpoints 710, such as mobile computing devices, may obtain network access via a wireless broadband network, by exchanging requests and responses 724 through an access point (e.g., a cellular network tower) 734. Some client endpoints 710, such as autonomous vehicles may obtain network access for requests and responses 726 via a wireless vehicular network through a street-located network system 736. However, regardless of the type of network access, the TSP may deploy aggregation points 742, 744 within the Edge cloud 510 to aggregate traffic and requests. Thus, within the Edge cloud 510, the TSP may deploy various compute and storage resources, such as at Edge aggregation nodes 740, to provide requested content. The Edge aggregation nodes 740 and other systems of the Edge cloud 510 are connected to a cloud or data center 760, which uses a backhaul network 750 to fulfill higher-latency requests from a cloud/data center for websites, applications, database servers, etc. Additional or consolidated instances of the Edge aggregation nodes 740 and the aggregation points 742, 744, including those deployed on a single server framework, may also be present within the Edge cloud 510 or other areas of the TSP infrastructure.

FIG. 8 depicts an example of an infrastructure processing unit (IPU) 800 that may be used to implement the IPUs 120A-D of FIG. 1 and/or the IPU 120 of FIG. 2. Different examples of IPUs disclosed herein enable improved performance, management, security and coordination functions between entities (e.g., cloud service providers), and enable infrastructure offload and/or communications coordination functions. As disclosed in further detail below, IPUs may be integrated with smart NICs and storage or memory (e.g., on a same die, system on chip (SoC), or connected dies) that are located at on-premises systems, base stations, gateways, neighborhood central offices, and so forth. Different examples of one or more IPUs disclosed herein can perform an application including any number of microservices, where each microservice runs in its own process and communicates using protocols (e.g., an HTTP resource API, message service or gRPC). Microservices can be independently deployed using centralized management of these services. A management system may be written in different programming languages and use different data storage technologies.

Furthermore, one or more IPUs can execute platform management, networking stack processing operations, security (crypto) operations, storage software, identity and key management, telemetry, logging, monitoring and service mesh (e.g., control how different microservices communicate with one another). The IPU can access an xPU to offload performance of various tasks. For instance, an IPU exposes xPU, storage, memory, and CPU resources and capabilities as a service that can be accessed by other microservices for function composition. This can improve performance and reduce data movement and latency. An IPU can perform capabilities such as those of a router, load balancer, firewall, TCP/reliable transport, a service mesh (e.g., proxy or API gateway), security, data-transformation, authentication, quality of service (QoS), security, telemetry measurement, event logging, initiating and managing data flows, data placement, or job scheduling of resources on an xPU, storage, memory, or CPU.

In the illustrated example of FIG. 8, the IPU 800 includes or otherwise accesses secure resource managing circuitry 802, network interface controller (NIC) circuitry 804, security and root of trust circuitry 806, resource composition circuitry 808, time stamp managing circuitry 810, memory and storage 812, processing circuitry 814, accelerator circuitry 816, and/or translator circuitry 818. Any number and/or combination of other structure(s) can be used such as but not limited to compression and encryption circuitry 820, memory management and translation unit circuitry 822, compute fabric data switching circuitry 824, security policy enforcing circuitry 826, device virtualizing circuitry 828, telemetry, tracing, logging and monitoring circuitry 830, quality of service circuitry 832, searching circuitry 834, network functioning circuitry (e.g., routing, firewall, load balancing, network address translating (NAT), etc.) 836, reliable transporting, ordering, retransmission, congestion controlling circuitry 838, and high availability, fault handling and migration circuitry 840 shown in FIG. 8. Different examples can use one or more structures (components) of the example IPU 800 together or separately. For example, compression and encryption circuitry 820 can be used as a separate service or chained as part of a data flow with vSwitch and packet encryption.

In some examples, IPU 800 includes a field programmable gate array (FPGA) 870 structured to receive commands from an CPU, XPU, or application via an API and perform commands/tasks on behalf of the CPU, including workload management and offload or accelerator operations. The illustrated example of FIG. 8 may include any number of FPGAs configured and/or otherwise structured to perform any operations of any IPU described herein.

Example compute fabric circuitry 850 provides connectivity to a local host or device (e.g., server or device (e.g., xPU, memory, or storage device)). Connectivity with a local host or device or smartNIC or another IPU is, in some examples, provided using one or more of peripheral component interconnect express (PCIe), ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), HyperTransport, NVLink, Advanced Microcontroller Bus Architecture (AMBA) interconnect, OpenCAPI, Gen-Z, CCIX, Infinity Fabric (IF), and so forth. Different examples of the host connectivity provide symmetric memory and caching to enable equal peering between CPU, XPU, and IPU (e.g., via CXL.cache and CXL.mem).

Example media interfacing circuitry 860 provides connectivity to a remote smartNIC or another IPU or service via a network medium or fabric. This can be provided over any type of network media (e.g., wired or wireless) and using any protocol (e.g., Ethernet, InfiniBand, Fiber channel, ATM, to name a few).

In some examples, instead of the server/CPU being the primary component managing IPU 800, IPU 800 is a root of a system (e.g., rack of servers or data center) and manages compute resources (e.g., CPU, xPU, storage, memory, other IPUs, and so forth) in the IPU 800 and outside of the IPU 800. Different operations of an IPU are described below.

In some examples, the IPU 800 performs orchestration to decide which hardware or software is to execute a workload based on available resources (e.g., services and devices) and considers service level agreements and latencies, to determine whether resources (e.g., CPU, xPU, storage, memory, etc.) are to be allocated from the local host or from a remote host or pooled resource. In examples when the IPU 800 is selected to perform a workload, secure resource managing circuitry 802 offloads work to a CPU, xPU, or other device and the IPU 800 accelerates connectivity of distributed runtimes, reduce latency, CPU and increases reliability.

In some examples, secure resource managing circuitry 802 runs a service mesh to decide what resource is to execute workload, and provide for L7 (application layer) and remote procedure call (RPC) traffic to bypass kernel altogether so that a user space application can communicate directly with the example IPU 800 (e.g., IPU 800 and application can share a memory space). In some examples, a service mesh is a configurable, low-latency infrastructure layer designed to handle communication among application microservices using application programming interfaces (APIs) (e.g., over remote procedure calls (RPCs)). The example service mesh provides fast, reliable, and secure communication among containerized or virtualized application infrastructure services. The service mesh can provide critical capabilities including, but not limited to service discovery, load balancing, encryption, observability, traceability, authentication and authorization, and support for the circuit breaker pattern.

In some examples, infrastructure services include a composite node created by an IPU at or after a workload from an application is received. In some cases, the composite node includes access to hardware devices, software using APIs, RPCs, gRPCs, or communications protocols with instructions such as, but not limited to, iSCSI, NVMe-oF, or CXL.

In some cases, the example IPU 800 dynamically selects itself to run a given workload (e.g., microservice) within a composable infrastructure including an IPU, xPU, CPU, storage, memory, and other devices in a node.

In some examples, communications transit through media interfacing circuitry 860 of the example IPU 800 through a NIC/smartNIC (for cross node communications) or loopback back to a local service on the same host. Communications through the example media interfacing circuitry 860 of the example IPU 800 to another IPU can then use shared memory support transport between xPUs switched through the local IPUs. Use of IPU-to-IPU communication can reduce latency and jitter through ingress scheduling of messages and work processing based on service level objective (SLO).

For example, for a request to a database application that requires a response, the example IPU 800 prioritizes its processing to minimize the stalling of the requesting application. In some examples, the IPU 800 schedules the prioritized message request issuing the event to execute a SQL query database and the example IPU constructs microservices that issue SQL queries and the queries are sent to the appropriate devices or services.

Flowcharts representative of example hardware logic circuitry, machine readable instructions, hardware implemented state machines, and/or any combination thereof for implementing the IPU 120 of FIG. 2 are shown in FIGS. 9A-9B and 10A-10B. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 13 and/or 14. The program(s) may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program(s) and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) is(are) described with reference to the flowcharts illustrated in FIGS. 9A-B and 10A-B, many other methods of implementing the example IPU 120 may alternatively be used. For example, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

Figure 10A:
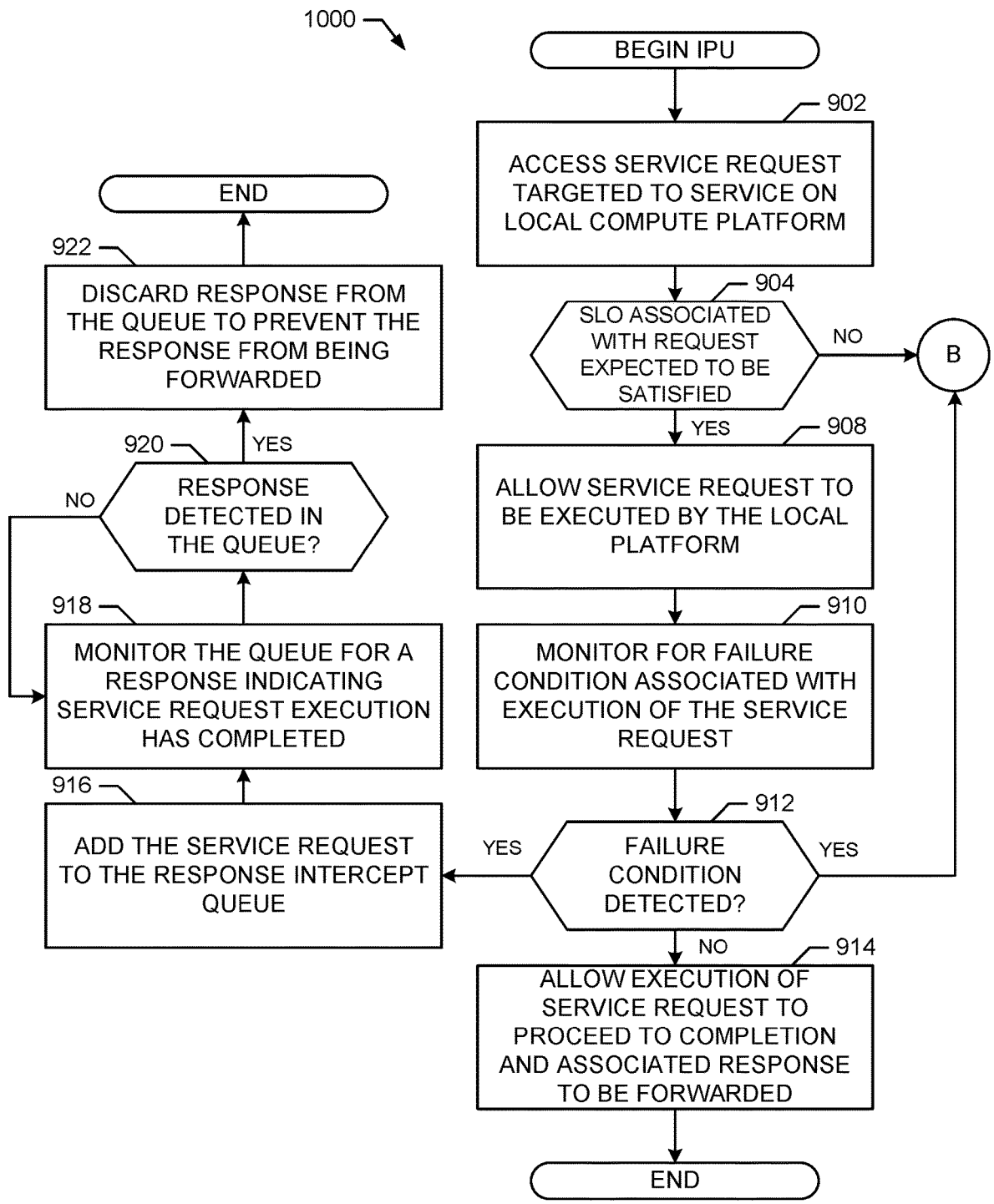
FIGS. 10A-10C collectively illustrate flowchart representative of example machine readable instructions and/or example operations that may be executed by example processor circuitry to implement the example IPUs associated with the compute platforms of FIGS. 1 and/or 2, and/or the example switch of FIGS. 1 and/or 3.
Figure 10B:
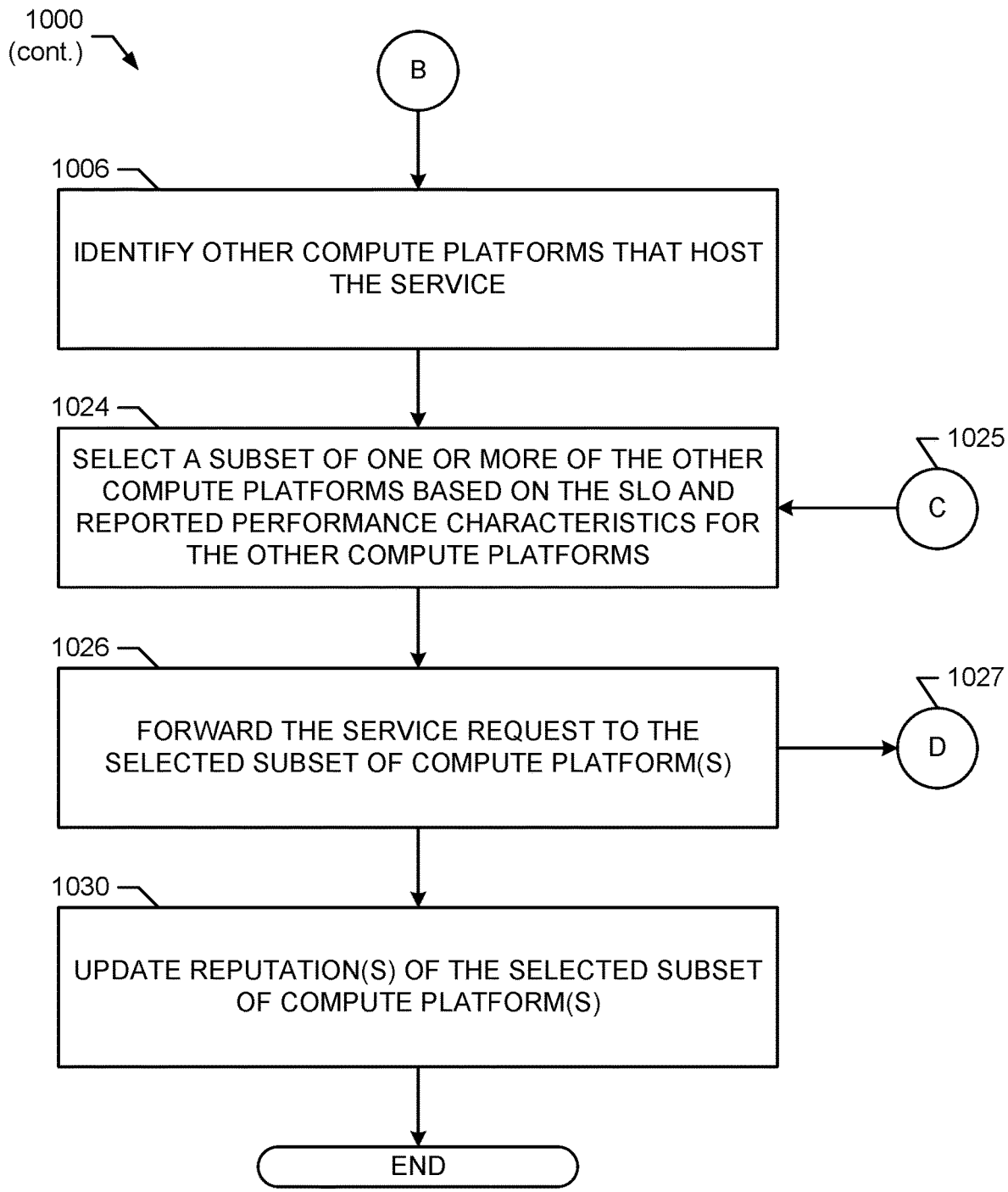
Figure 10C:
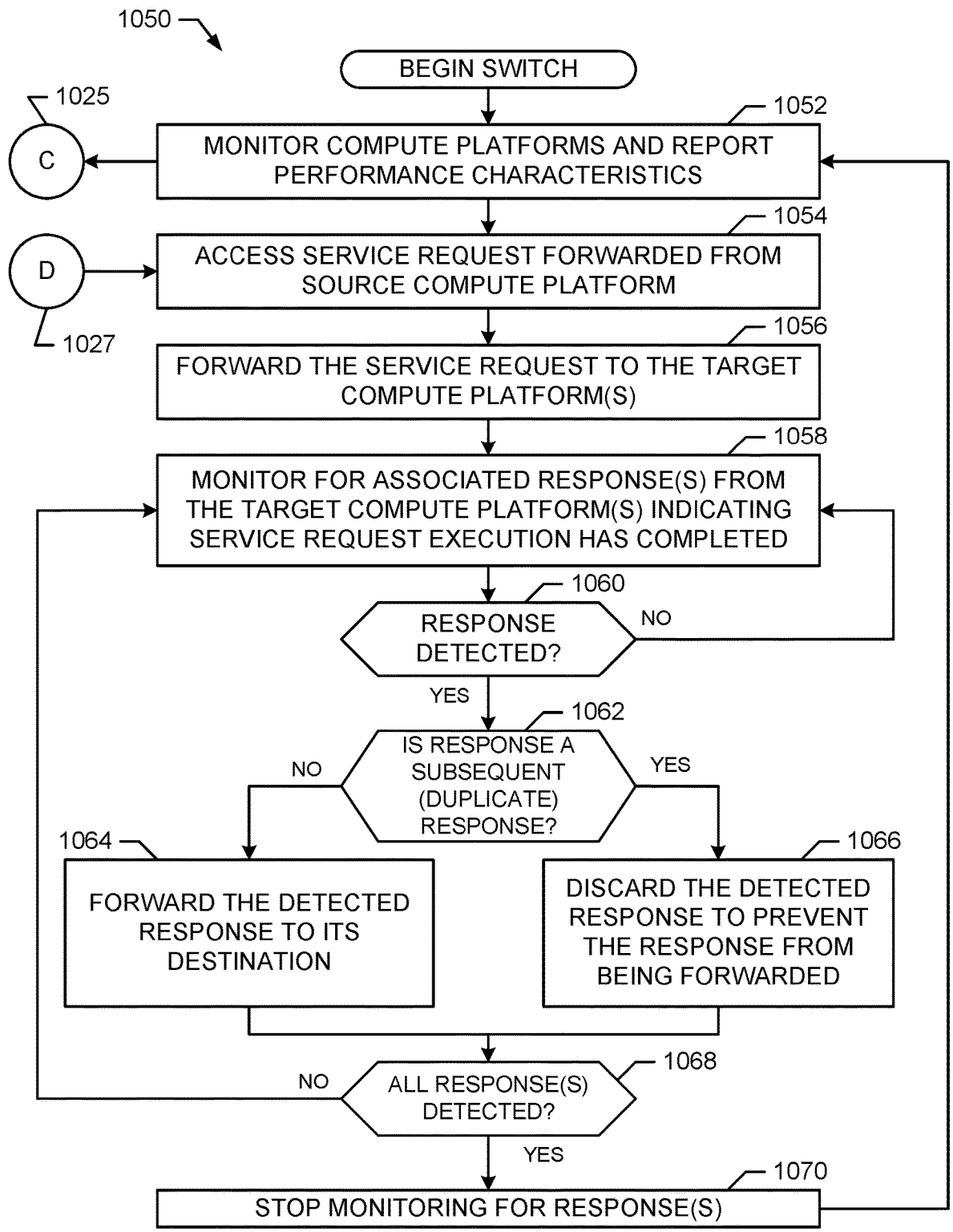

A flowchart representative of example hardware logic circuitry, machine readable instructions, hardware implemented state machines, and/or any combination thereof for implementing the switch 135 of FIG. 3 is shown in FIG. 10C. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The program(s) may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program(s) and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) is(are) described with reference to the flowchart illustrated in FIG. 10C, many other methods of implementing the example switch 135 may alternatively be used. For example, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. [figure nos.] may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3)

at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 9A:
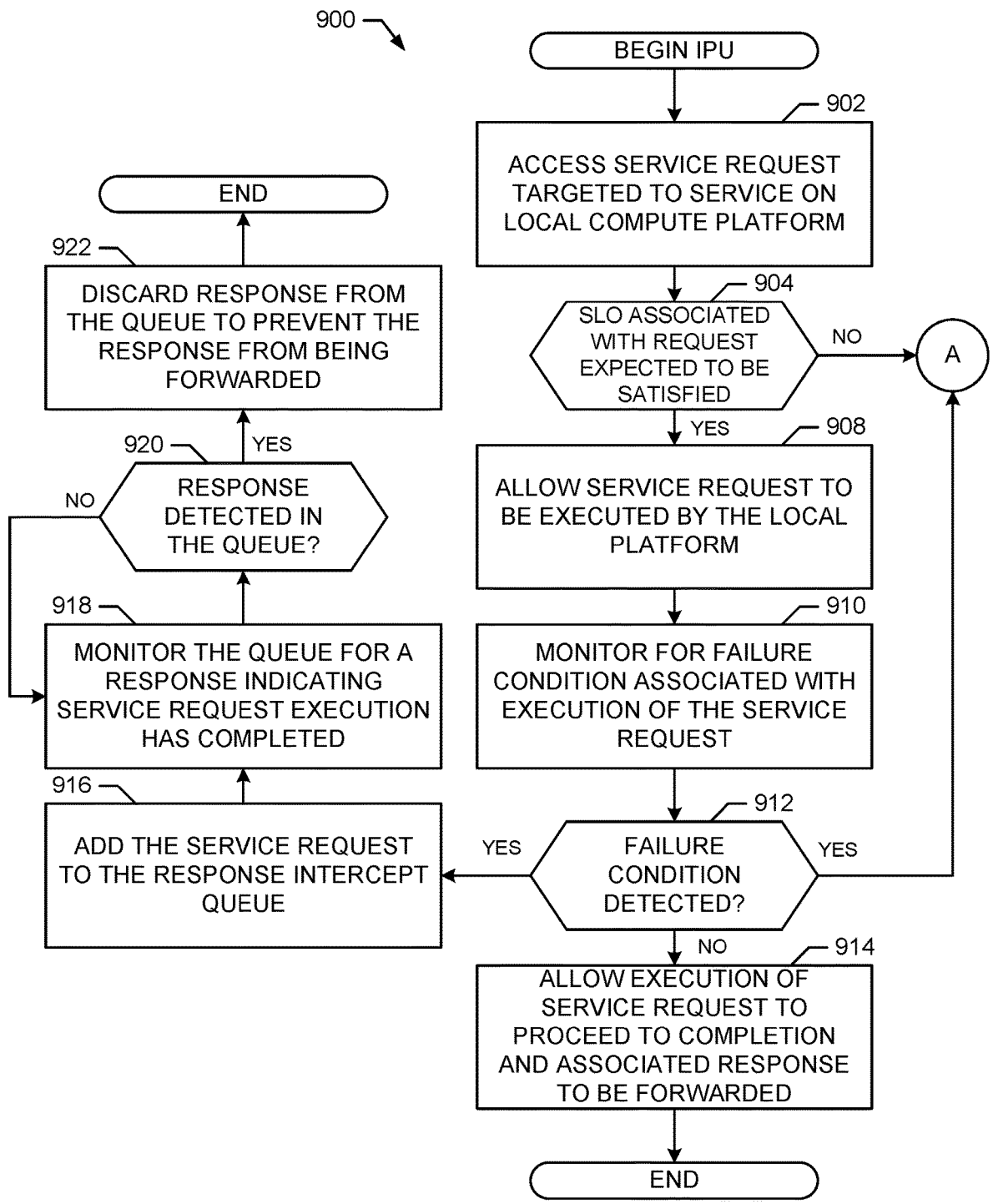
FIGS. 9A-9B collectively illustrate a flowchart representative of example machine readable instructions and/or example operations that may be executed by example processor circuitry to implement example IPUs associated with the compute platforms of FIGS. 1 and/or 2.
Figure 9B:
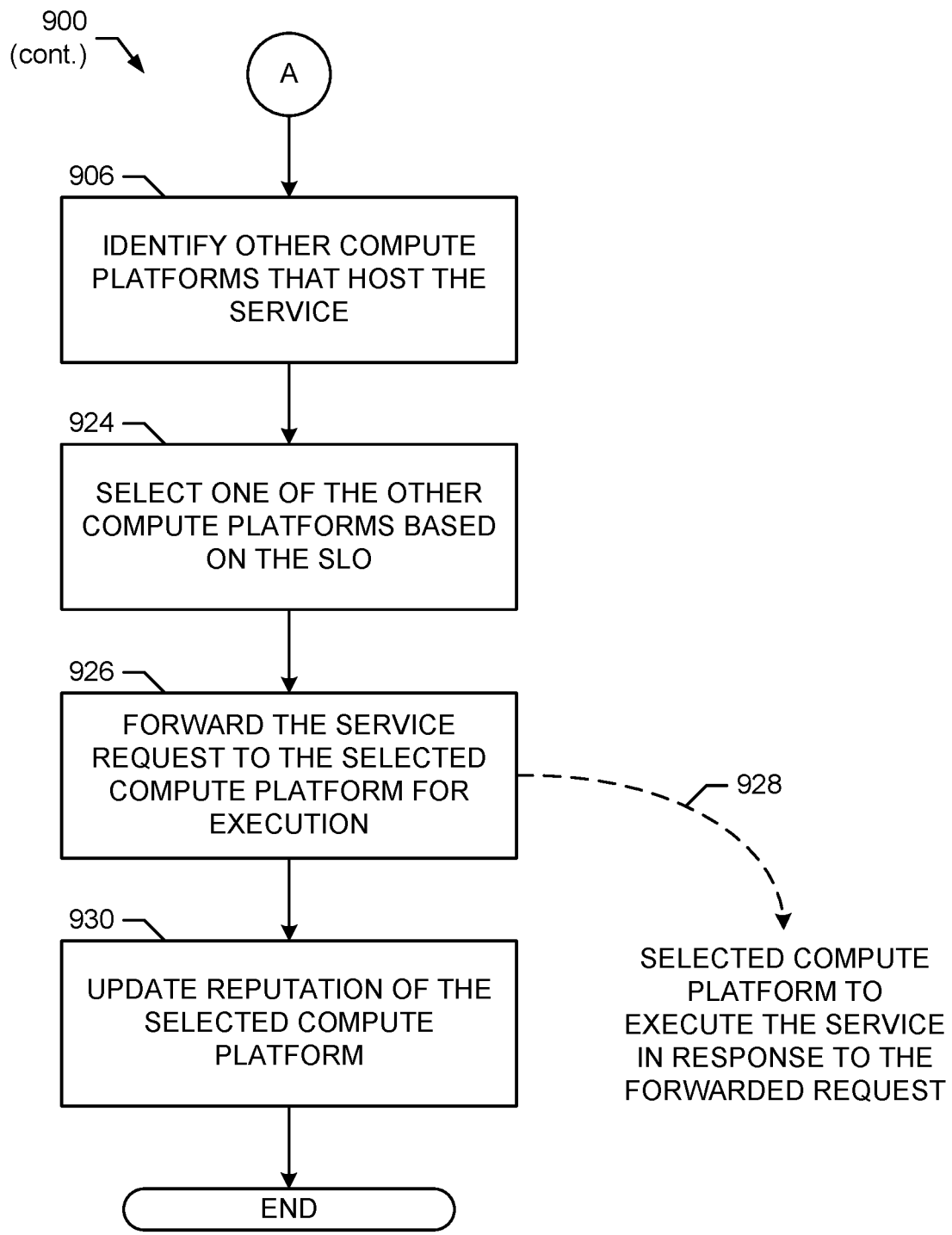

FIGS. 9A-9B collectively illustrate a flowchart representative of example machine readable instructions and/or example operations 900 that may be executed and/or instantiated by processor circuitry to perform service failover in accordance with teachings of this disclosure. For example, the machine readable instructions and/or operations 900 may be executed and/or instantiated by the example IPUs 120A-D of FIG. 1 and/or the example IPU 120 of FIG. 2. For convenience, the machine readable instructions and/or operations 900 are described from the perspective of the IPU 120. With reference to the preceding figures and associated written descriptions, the machine readable instructions and/or operations 900 of FIGS. 9A-9B begin at block 902 of FIG. 9A, at which the request forwarding circuitry 215 of the IPU 120 accesses a service request targeted to a service 125 on the local compute platform 105, as described above. At block 904, the request forwarding circuitry 215 determines, as described above, whether an SLO associated with the request is expected to be satisfied if the service request is executed by the local compute platform 105. If the SLO is not expected to be satisfied (NO branch from block 904), the machine readable instructions and/or operations 900 proceed to block 906 of FIG. 9B, which is described below.

However, if the SLO is expected to be satisfied (YES branch from block 904), then at block 908 the request forwarding circuitry 215 causes the service request to be executed by the service 125 on the local compute platform 105 (or, in some examples, causes the service 125 itself to be executed by the local compute platform 105), as described above. At block 910, the service monitoring circuitry 210 of the IPU 120 monitors for a failure condition associated with execution of the service request, as described above. In some examples, at block 910, the platform monitoring circuitry 230 additionally or alternatively monitors telemetry data (e.g., obtained by the telemetry collecting circuitry 225 of the IPU 120) to determine whether one or more platform characteristics are indicative of a service failure condition, as described above. At block 912, the service monitoring circuitry 210 and/or the platform monitoring circuitry 230 determine whether a failure condition associated with execution of the service request by the service 125 (or, in some examples, execution of the service 125 itself) has been detected. If a failure condition is not detected (NO branch from block 912), at block 914 the request forwarding circuitry 215 allows execution of the service request by the service 125 on the local compute platform 105 to proceed and the associated service response (e.g., indicating execution of the service has completed) to be forwarded to the originator of the request.

However, if a failure condition is detected (YES branch from block 912), the machine readable instructions and/or operations 900 proceed to both block 916 of FIG. 9A and block 906 of FIG. 9B. At block 916, the response monitoring circuitry 205 of the IPU 120 adds the service request associated with the service 125 to the response intercept queue 245, as described above. At block 918, the response monitoring circuitry 205 monitors the response intercept queue 245 for a response from the service 125 (e.g., indicating execution of the service request by the service 125 has completed, execution of the service 125 itself is completed, etc.). At block 920, the response monitoring circuitry 205 determines whether the response has been detected. If the response is not detected (NO branch from block 920), the response monitoring circuitry 205 continues to monitor the response intercept queue 245 (block 918). However, if the response is detected (YES branch from block 920), at block 922 the response monitoring circuitry 205 discards the service response from the response intercept queue 245 to prevent the response from being forwarded to the originator of the request.

At block 906 of FIG. 9B, which is reached if the SLO associated with the service request is not expected to be satisfied by the local compute platform 105 (NO branch from block 904) or a service failure condition is detected (YES branch from block 912), the request forwarding circuitry 215 identifies, as described above, one or more other compute platforms hosting instance(s) of the service 125 associated with the request accessed at block 902. At block 924, the request forwarding circuitry 215 selects one of those other compute platforms based on one or more selection criteria. For example, the request forwarding circuitry 215 may select one of the other compute platforms hosting instance(s) of the service 125 based on whether that compute platform is likely to satisfy the SLO associated with the request (e.g., as indicated by performance characteristics obtained by the IPU 120 for the compute platforms 125A-D in the compute infrastructure 100, as described above). In some examples, the request forwarding circuitry 215 may employ additional or alternative selection criteria, such as a round robin selection approach, a randomized selection approach, etc., to select among the other compute platform (s) hosting instance(s) of the service 125 associated with the request accessed at block 902.

At block 926, the request forwarding circuitry 215 causes the request accessed at block 902 to be forwarded, as described above, from the local compute platform 105 to the compute platform selected at block 924. As indicated by the directed line 928 in FIG. 9B, such forwarding of the request causes the selected compute platform to execute the service request with the instance of the service 125 on that platform, or the IPU associated with that selected compute platform to perform service failover to forward the request again using the service failover operations described above. In some examples, at block 930, the request forwarding circuitry 215 updates a reputation associated with the selected compute platform to indicate that compute platform was selected to handle the forwarded request. For example, the service topology mapping circuitry 220 may maintain reputations associated with the compute platforms 105A-D in the compute infrastructure 100 to aid in the selection of targets for forwarded service requests.

FIGS. 10A-10C collectively illustrate a flowchart representative of example machine readable instructions and/or example operations 1000 and a flowchart representative of example machine readable instructions and/or example operations 1050 that may be executed and/or instantiated by processor circuitry to perform service failover in accordance with teachings of this disclosure. For example, the machine readable instructions and/or operations 1000 illustrated in FIGS. 10A-B may be executed and/or instantiated by the example IPUs 120A-D of FIG. 1 and/or the IPU 120 of FIG. 2, whereas the machine readable instructions and/or operations 1050 illustrated in FIG. 10C may be executed and/or instantiated by the example switch 135 of FIGS. 1 and/or 2. For convenience, the machine readable instructions and/or operations 1000 illustrated in FIGS. 10A-10B are described from the perspective of the IPU 120. Furthermore, the portion of the machine readable instructions and/or operations 1000 illustrated in FIG. 10A includes blocks 902, 904, 908, 910, 912, 914, 916, 918, 920 and 922 of FIG. 9A. Accordingly, operation of those blocks is described in detail above in connection with FIG. 9A.

With reference to the preceding figures and associated written descriptions, the machine readable instructions and/or operations 1000 of FIGS. 10A-10B begin at block 902 and proceeds to blocks 904, 908, 910, 912, 914, 916, 918, 920 and 922 as described above in connection with FIG. 9A. However, in contrast with the illustrated example of FIG. 9A, in the example of FIG. 10A, if the SLO associated with the service request is not expected to be satisfied by the local compute platform 105 (NO branch from block 904) or a service failure condition is detected (YES branch from block 912), the machine readable instructions and/or operations 1000 proceed to block 1006 of FIG. 9B. At block 1006, the request forwarding circuitry 215 of the IPU 120 identifies, as described above, one or more other compute platforms hosting instance(s) of the service 125 associated with the request accessed at block 902. At block 1024, the request forwarding circuitry 215 selects, as described above, a subset of one or more (e.g., multiple) of those other compute platforms based on the SLO associated with the service request and reported performance characteristics obtained from the switch 135 for the other compute platforms (e.g., indicated by the circle 1025 in FIG. 10B). As described above, the request forwarding circuitry 215 can select multiple compute platforms to which the request is to be forwarded to increase the likelihood the SLO will be met by at least one of the selected compute platforms, thereby decreasing the likelihood that a service failure condition will occur in the first place.

At block 1026, the request forwarding circuitry 215 causes the request accessed at block 902 to be forwarded, as described above, from the local compute platform 105 to the subset of compute platforms selected at block 926. For example, the request forwarding circuitry 215 can cause the local compute platform 105 to forward a single request specifying the subset of compute platforms to the switch 135 (e.g., indicated by the circle 1027 in FIG. 10B), and the switch 135 can replicate the request as needed to forward the request to the specified subset of the compute platforms. In some examples, at block 1030, the request forwarding circuitry 215 updates the reputation(s) associated with the compute platform(s) included in the selected subset to indicate those compute platform(s) was(were) selected to handle the forwarded request. For example, the service topology mapping circuitry 220 may maintain reputations associated with the compute platforms 105A-D in the compute infrastructure 100 to aid in the selection of targets for forwarded service requests.

With reference to the preceding figures and associated written descriptions, the machine readable instructions and/or operations 1050 of FIG. 10C begin at block 1052 at which the service delegation monitoring circuitry 305 of the switch 135 monitors the compute platforms 105A-D of the compute infrastructure 100 and disseminates the monitored performance characteristics among the compute platforms 105A-D, as describe above. For example, the service delegation monitoring circuitry 305 of the switch 135 may obtain the respective performance characteristics for the compute platforms 105A-D of the compute infrastructure 100 and report them to the IPU 120 of the compute platform 105 (e.g., indicated by the circle 1025 in FIG. 10C). At block 1054, the service request forwarding circuitry 310 of the switch 135 accesses, as described above, a service request that was forwarded from the IPU 120 of the compute platform 105 (e.g., indicated by the circle 1027 in FIG. 10C). At block 1056, the service request forwarding circuitry 310 forwards the service request to the subset of compute platforms specified in the forwarded service request, as described above. At block 1058, the duplicate response detection circuitry 315 of the switch 135 monitors for service response(s) from the target compute platform(s) to which the service request was forwarded, as described above. At block 1060, the duplicate response detection circuitry 315 determines whether a service response has been detected. If no response has been detected (NO branch from block 1060), the duplicate response detection circuitry 315 continues to monitor for service response(s) (block 1058).

However, if a service response is detected (YES branch from block 1060), at block 1062 the duplicate response detection circuitry 315 determines whether the detected response is a subsequent, or duplicate, response, as described above. If the detected response is not a subsequent (duplicate) response (NO branch from block 1062), at block 1064 the duplicate response detection circuitry 315 determines that the detected response is the first, or initial, response to the forwarded service request and allows the detected response to be forwarded to its destination, as described above. However, if the detected response is a subsequent (duplicate) response (YES branch from block 1062), at block 1068 the duplicate response detection circuitry 315 discards the detected response to prevent the response from being forwarded, as described above.

At block 1068, the duplicate response detection circuitry 315 determines whether all response(s) have been detected (e.g., from the subset of compute platforms to which the service request was forwarded at block 1056). If all response(s) have not been detected (NO branch from block 1068), the duplicate response detection circuitry 315 continues to monitor for service response(s) (block 1058). However, if all response(s) have been detected (YES branch from block 1068), the duplicate response detection circuitry 315 stop monitoring for response(s) associated with the service request that was forwarded at block 1056.

Figure 11:
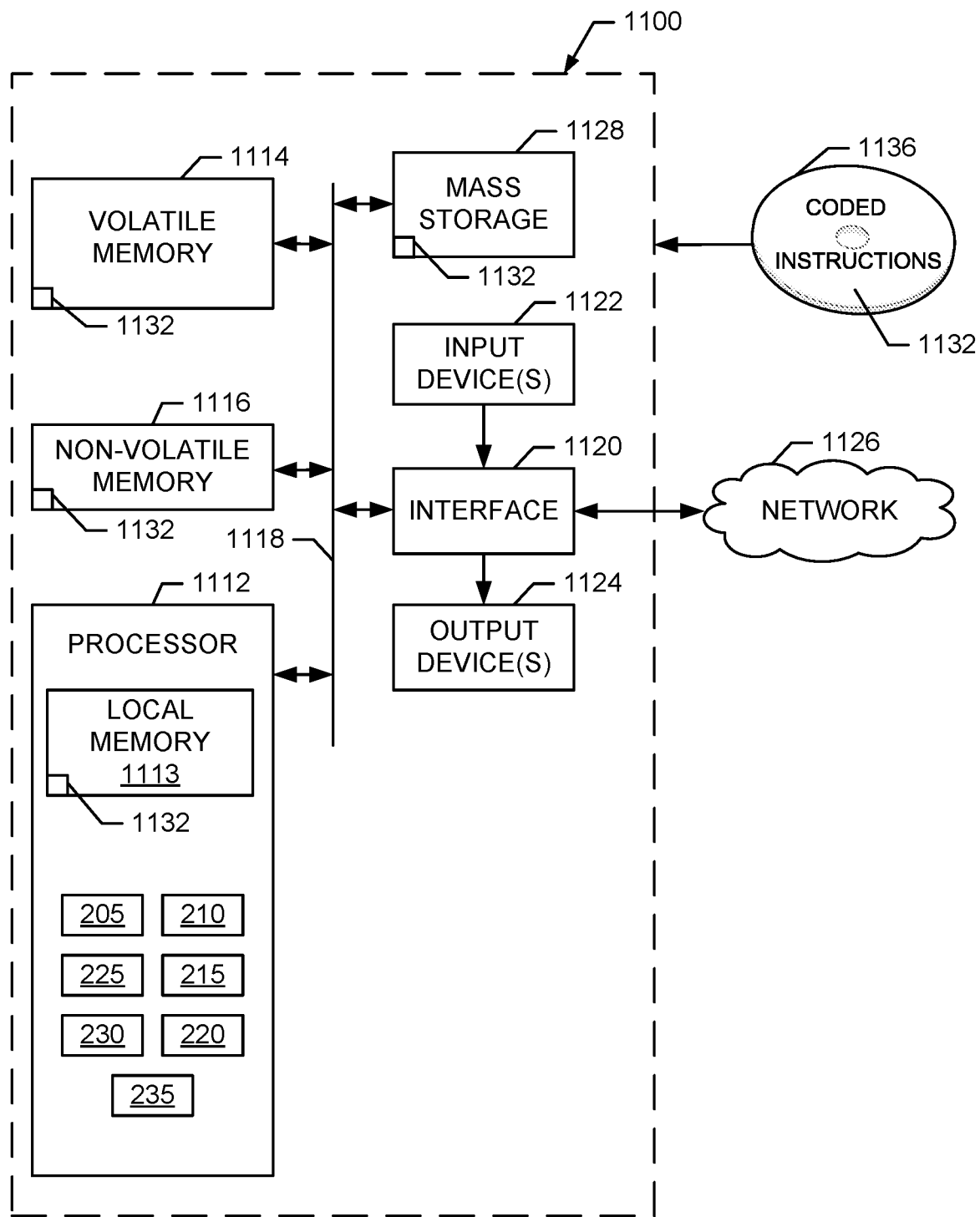
FIG. 11 is a block diagram of an example processor platform including processor circuitry structured to execute the example machine readable instructions of FIGS. 9A-9B and/or 10A-10B to implement one or more of the example IPUs associated with the compute platforms of FIGS. 1 and/or 2.

FIG. 11 is a block diagram of an example processor platform 1100 structured to execute and/or instantiate the machine readable instructions and/or the operations of FIGS. 9A-9B and/or 10A-10B to implement the IPU 120 of FIG. 2. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example response monitoring circuitry 205, the example service monitoring circuitry 210, the example request forwarding circuitry 215, the example service topology mapping circuitry 220, the example telemetry collecting circuitry 225, the example platform monitoring circuitry 230 and/or the example interface circuitry 235.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, a trackbar, an isopoint device, a voice recognition system and/or any other human-machine interface. In some examples, the input device(s) 1122 are arranged or otherwise configured to allow the user to control the processor platform 1100 and provide data to the processor platform 1100 using physical gestures, such as, but not limited to, hand or body movements, facial expressions, face recognition, etc.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1132, which may be implemented by the machine readable instructions of FIGS. 9A-B and/or 10A-B, may be stored in the mass storage device 1128, in the volatile memory 1114, in the non-volatile memory 1116, and/or on a removable non-transitory computer readable storage medium such as a CD or DVD.

Figure 12:
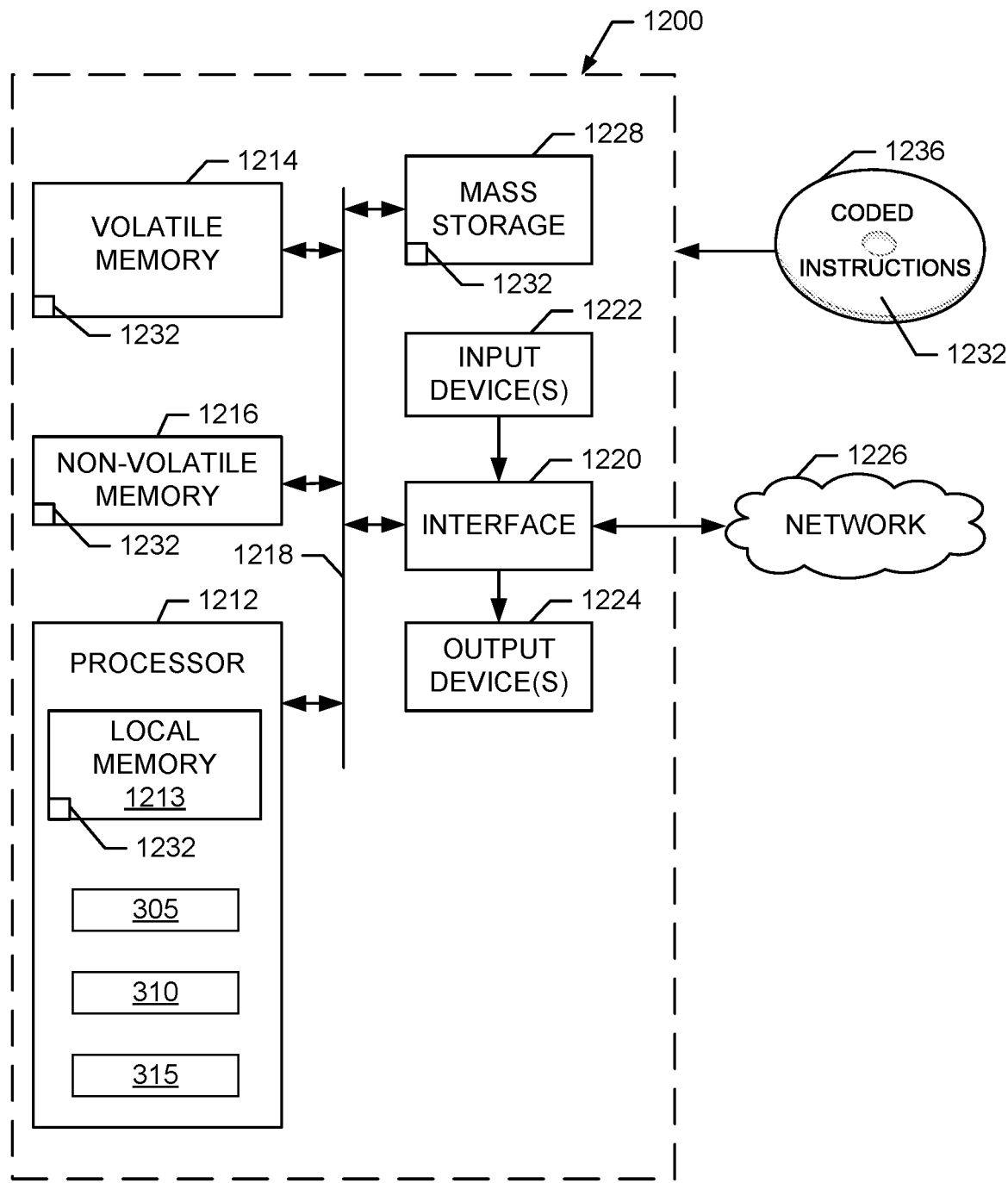
FIG. 12 is a block diagram of an example processor platform including processor circuitry structured to execute the example machine readable instructions of FIG. 10C to implement the example server of FIG. 1 and/or 3.

FIG. 12 is a block diagram of an example processor platform 1200 structured to execute and/or instantiate the machine readable instructions and/or the operations of FIG. 10C to implement the switch 135 of FIG. 3. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the example service delegation monitoring circuitry 305, the example service request forwarding circuitry 310, the example duplicate response detection circuitry 315.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, a trackbar, an isopoint device, a voice recognition system and/or any other human-machine interface. In some examples, the input device(s) 1222 are arranged or otherwise configured to allow the user to control the processor platform 1200 and provide data to the processor platform 1200 using physical gestures, such as, but not limited to, hand or body movements, facial expressions, face recognition, etc.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1232, which may be implemented by the machine readable instructions of FIG. 10C, may be stored in the mass storage device 1228, in the volatile memory 1214, in the non-volatile memory 1216, and/or on a removable non-transitory computer readable storage medium such as a CD or DVD.

Figure 13:
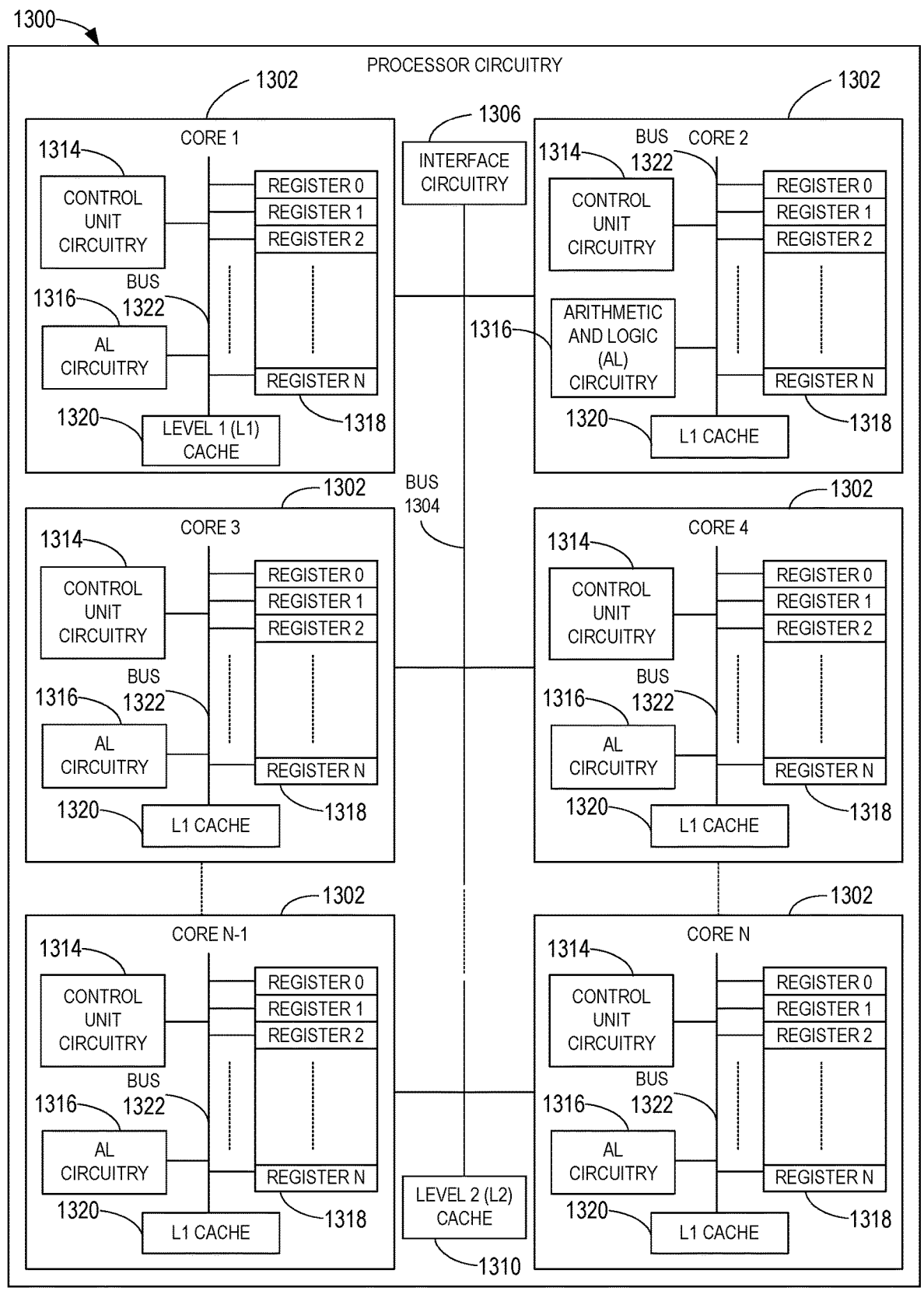
FIG. 13 is a block diagram of an example implementation of the processor circuitry of FIGS. 11 and/or 12.

FIG. 13 is a block diagram of an example implementation of the processor circuitry 1112 of FIG. 11 and/or the processor circuitry 1212 of FIG. 12. In this example, the processor circuitry 1112 of FIG. 11 and/or the processor circuitry 1212 of FIG. 12 is implemented by a general purpose microprocessor 1300. The general purpose microprocessor circuitry 1300 executes some or all of the machine readable instructions of the flowchart of FIGS. 9A-9B and/or 10A-10C to effectively instantiate the circuitry of FIGS. 2 and/or 3 as logic circuits to perform the operations corresponding to those machine readable instructions. In some such examples, the circuitry of FIGS. 2 and/or 3 is instantiated by the hardware circuits of the microprocessor 1300 in combination with the instructions. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 9A-9B and/or 10A-10C.

The cores 1302 may communicate by a first example bus 1304. In some examples, the first bus 1304 may implement a communication bus to effectuate communication associated with one(s) of the cores 1302. For example, the first bus 1304 may implement at least one of an Inter-Integrated Circuit (I2C) bus, a Serial Peripheral Interface (SPI) bus, a PCI bus, or a PCIe bus. Additionally or alternatively, the first bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2_cache)) for high-speed access to data and/or instructions. Data and/or instructions may be transferred (e.g., shared) by writing to and/or reading from the shared memory 1310. The local memory 1320 of each of the cores 1302 and the shared memory 10 may be part of a hierarchy of storage devices including multiple levels of cache memory and the main memory (e.g., the main memory 1114, 1116 of FIG. 11 and/or the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may implement at least one of an I2C bus, a SPI bus, a PCI bus, or a PCIe bus.

Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
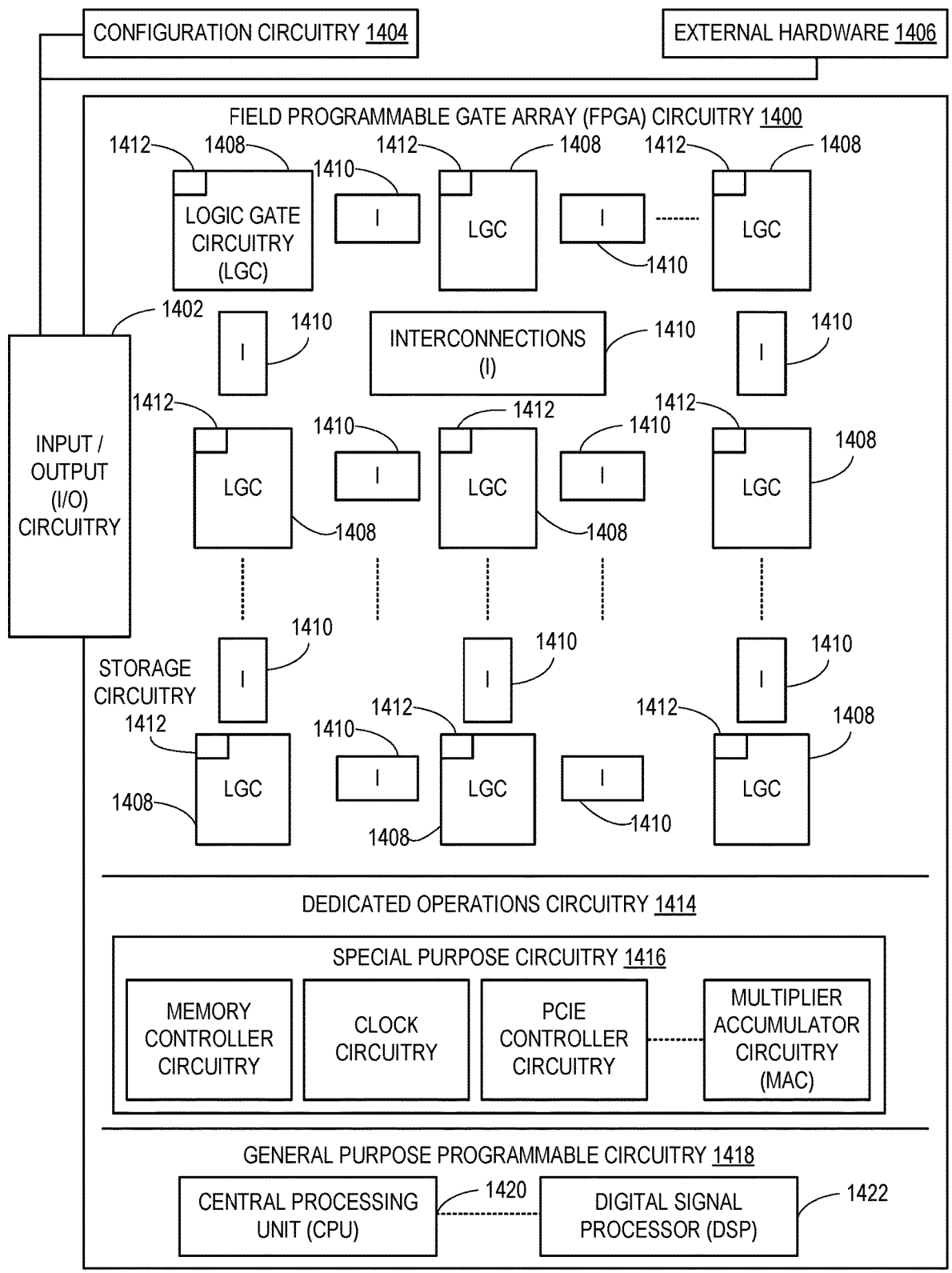
FIG. 14 is a block diagram of another example implementation of the processor circuitry of FIGS. 11 and/or 12.

FIG. 14 is a block diagram of another example implementation of the processor circuitry 1112 of FIG. 11 and/or the processor circuitry 1212 of FIG. 12. In this example, the processor circuitry 1112 and/or the processor circuitry 1212 is implemented by FPGA circuitry 1400. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowcharts of FIGS. 9A-9B and/or 10A-10C but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowcharts of FIGS. 9A-9B and/or 10A-10C. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowcharts of FIGS. 9A-9B and/or 10A-10C. As such, the FPGA circuitry 1400 may be structured to effectively instantiate some or all of the machine readable instructions of the flowcharts of FIGS. 9A-9B and/or 10A-10C as dedicated logic circuits to perform the operations corresponding to those software instructions in a dedicated manner analogous to an ASIC. Therefore, the FPGA circuitry 1400 may perform the operations corresponding to the some or all of the machine readable instructions of FIGS. 9A-9B and/or 10A-10C faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine readable instructions of FIGS. 9A-9B and/or 10A-10C and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1112 of FIG. 11 and/or the processor circuitry 1212 of FIG. 12, many other approaches are contemplated. For example, as mentioned above, modern FPGA circuitry may include an on-board CPU, such as one or more of the example CPU 1420 of FIG. 14. Therefore, the processor circuitry 1112 of FIG. 11 and/or the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowcharts of FIGS. 9A-9B and/or 10A-10C may be executed by one or more of the cores 1302 of FIG. 13, a second portion of the machine readable instructions represented by the flowcharts of FIGS. 9A-9B and/or 10A-10C may be executed by the FPGA circuitry 1400 of FIG. 14, and/or a third portion of the machine readable instructions represented by the flowcharts of FIGS. 9A-9B and/or 10A-10C may be executed by an ASIC. It should be understood that some or all of the circuitry of FIGS. 2 and/or 3 may, thus, be instantiated at the same or different times. Some or all of the circuitry may be instantiated, for example, in one or more threads executing concurrently and/or in series. Moreover, in some examples, some or all of the circuitry of FIGS. 2 and/or 3 may be implemented within one or more virtual machines and/or containers executing on the microprocessor.

In some examples, the processor circuitry 1112 of FIG. 11 and/or the processor circuitry 1212 of FIG. 12 may be in one or more packages. For example, the processor circuitry 1300 of FIG. 13 and/or the FPGA circuitry 1400 of FIG. 14 may be in one or more packages. In some examples, an XPU may be implemented by the processor circuitry 1112 of FIG. 11 and/or the processor circuitry 1212 of FIG. 12, which may be in one or more packages. For example, the XPU may include a CPU in one package, a DSP in another package, a GPU in yet another package, and an FPGA in still yet another package.

Figure 15:
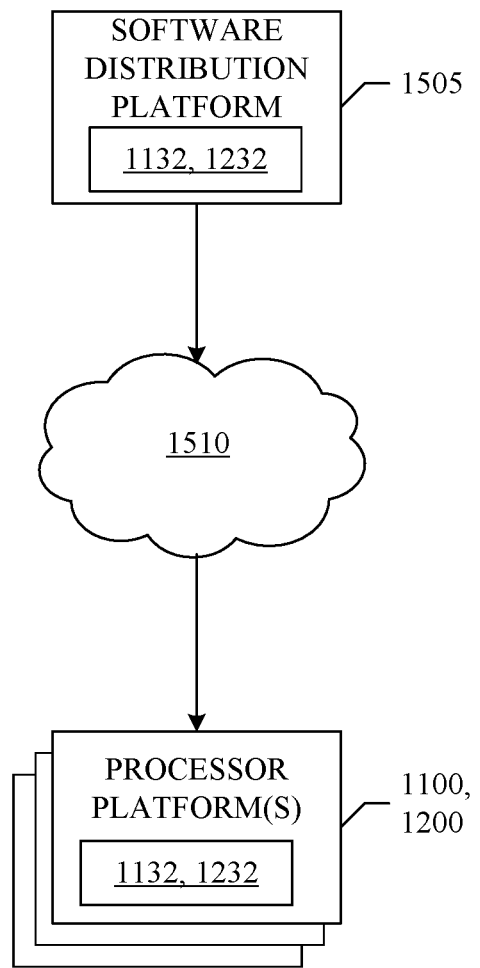
FIG. 15 is a block diagram of an example software distribution platform (e.g., one or more servers) to distribute software (e.g., software corresponding to the example machine readable instructions of FIGS. 9A-9B and/or FIGS. 10A-10C) to client devices associated with end users and/or consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1132 of FIG. 11 and/or the example machine readable instructions 1232 of FIG. 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1132 of FIG. 11 and/or the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1132 and/or the example machine readable instructions 1232 of FIG. 12, which may correspond to the example machine readable instructions of FIGS. 9A-9B and/or 10A-10C, as described above. The one or more servers of the example software distribution platform 1505 are in communication with a network 1510, which may correspond to any one or more of the Internet and/or any of the example networks 1126 and/or 1226 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 and/or the example machine readable instructions 1232 from the software distribution platform 1505. For example, the software, which may correspond to the example machine readable instructions of FIGS. 9A-9B and/or 10A-10C, may be downloaded to the example processor platform 1100, which is to execute the machine readable instructions 1132 to implement the IPU 120, and/or to the example processor platform 1200, which is to execute the machine readable instructions 1232 to implement the switch 135. In some examples, one or more servers of the software distribution platform 1505 periodically offer, transmit, and/or force updates to the software (e.g., the example machine readable instructions 1132 of FIG. 11 and/or the example machine readable instructions 1232 of FIG. 12) to ensure improvements, patches, updates, etc., are distributed and applied to the software at the end user devices.

From the foregoing, it will be appreciated that example systems, methods, apparatus, and articles of manufacture have been disclosed that perform service failover. Disclosed systems, methods, apparatus, and articles of manufacture improve the efficiency of using a computing device by utilize an IPU, or similar processor circuitry, included in or otherwise associated with a compute platform to locally perform service failover at that compute platform. Furthermore, some example service failover implementations disclosed herein utilize a combination of the compute platform's IPU and a switch, or other networking device, interconnecting the compute platforms of the compute infrastructure to perform service failover, as well as enhance reliability of service completion to reduce the frequency at which service failover may need to be performed. For example, a disclosed example IPU may perform monitoring of service requests executing its compute platform and perform local service failure techniques if a service failure condition is detected. In some examples, the IPU may also implemented a service request replication scheme that is triggered to improve the likelihood of meeting a service level objective associated with a service request. In some examples, the switch acts as a global agent that provides performance information to the IPU, which is used by the IPU to implement its service request replication scheme. In some examples, the IPU and/or the switch implement techniques to discard stale responses to service requests, which may break application flows. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to perform service failover are disclosed herein. Further examples and combinations thereof include the following:

Example 1 includes an apparatus to perform service failover, the apparatus comprising memory, instructions, and processor circuitry to execute the instructions to at least detect a failure condition associated with execution of a service by a first compute platform, the execution of the service responsive to a first request, send a second request to a second compute platform to execute the service, monitor a queue of the first compute platform for a response to the first request, the response to indicate execution of the service by the first compute platform has completed, and when the response is detected in the queue, discard the response from the queue.

Example 2 includes the apparatus of example 1, wherein the first request is associated with a service level objective (SLO), and the processor circuitry is to select the second compute platform based on the SLO from a plurality of compute platforms included in a compute infrastructure, the plurality of compute platforms including the first compute platform and the second compute platform.

Example 3 includes the apparatus of example 2, wherein the processor circuitry is to select the second compute platform and a third compute platform from the plurality of compute platforms based on the SLO, and send the second request to both the second compute platform and the third compute platform.

Example 4 includes the apparatus of example 2, wherein the first request is from a first one of the compute platforms in the compute infrastructure, and the processor circuitry is to discard the response from the queue to cause the response to not be forwarded to the first one of the compute platforms.

Example 5 includes the apparatus of any one of examples 1 to 4, wherein the memory includes a first memory region to store a status of the execution of the service by the first compute platform, the service is to update the status, and the processor circuitry is to monitor the status to determine whether the execution of the service by the first compute platform has stalled, and detect the failure condition when the execution of the service has stalled.

Example 6 includes the apparatus of example 5, wherein the service is associated with a certificate, and the processor circuitry is to validate the update of the status by the service based on the certificate.

Example 7 includes the apparatus of example 5, wherein the first memory region is a protected memory region associated with a trusted domain of the service.

Example 8 includes the apparatus of any one of examples 1 to 4, wherein the processor circuitry is to monitor one or more operational characteristics of the first compute platform, and detect the failure condition based on the one or more operational characteristics.

Example 9 includes the apparatus of examples 1 to 8, wherein the apparatus corresponds to the first compute platform, and the processor circuitry is implemented by an infrastructure processing unit (IPU) of the first compute platform.

Example 10 includes the apparatus of example 9, wherein the first compute platform corresponds to at least one of a server platform, an edge platform or a base station.

Example 11 includes an apparatus to perform service failover, the apparatus comprising interface circuitry to access a first request to execute a service, and, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate first monitoring circuitry to detect a failure condition associated with execution of the service by a first compute platform, the execution of the service responsive to the first request, request forwarding circuitry to send a second request to a second compute platform to execute the service, and second monitoring circuitry to monitor a queue of the first compute platform for a response to the first request, the response to indicate execution of the service by the first compute platform has completed, and when the response is detected in the queue, discard the response from the queue.

Example 12 includes the apparatus of example 11, wherein the first request is associated with a service level objective (SLO), and the request forwarding circuitry is to select the second compute platform based on the SLO from a plurality of compute platforms included in a compute infrastructure, the plurality of compute platforms including the first compute platform and the second compute platform.

Example 13 includes the apparatus of example 12, wherein the request forwarding circuitry is to select the second compute platform and a third compute platform from the plurality of compute platforms based on the SLO, and send the second request to both the second compute platform and the third compute platform.

Example 14 includes the apparatus of example 12, wherein the first request is from a first one of the compute platforms in the compute infrastructure, and the second monitoring circuitry is to discard the response from the queue to cause the response to not be forwarded to the first one of the compute platforms.

Example 15 includes the apparatus of any one of examples 11 to 14, wherein the service is to cause an update to a status of the execution of the service by the first compute platform to be stored in a memory, and the first monitoring circuitry is to monitor the status to determine whether the execution of the service by the first compute platform has stalled, and detect the failure condition when the execution of the service has stalled.

Example 16 includes the apparatus of example 15, wherein the service is associated with a certificate, and the first monitoring circuitry is to validate the update of the status by the service based on the certificate.

Example 17 includes the apparatus of example 15, wherein the memory is a protected memory associated with a trusted domain of the service.

Example 18 includes the apparatus of any one of examples 11 to 14, wherein the first monitoring circuitry is to monitor one or more operational characteristics of the first compute platform, and detect the failure condition based on the one or more operational characteristics.

Example 19 includes the apparatus of any one of examples 11 to 18, wherein the apparatus corresponds to the first compute platform, and the processor circuitry is implemented by an infrastructure processing unit (IPU) of the first compute platform.

Example 20 includes the apparatus of example 19, wherein the first compute platform corresponds to at least one of a server platform, an edge platform or a base station.

Example 21 includes at least one non-transitory computer readable medium comprising computer readable instructions that, when executed, cause at least one processor to at least detect a failure condition associated with execution of a service by a first compute platform, the execution of the service responsive to a first request, cause a second request to be sent to a second compute platform to execute the service, cause a response to the first request to be discarded from a queue of the first compute platform, the response to indicate execution of the service by the first compute platform has completed.

Example 22 includes the at least one non-transitory computer readable medium of example 21, wherein the first request is associated with a service level objective (SLO), and the instruction cause the at least one processor to select the second compute platform based on the SLO from a plurality of compute platforms included in a compute infrastructure, the plurality of compute platforms including the first compute platform and the second compute platform.

Example 23 includes the at least one non-transitory computer readable medium of example 22, wherein the instructions cause the at least one processor to select the second compute platform and a third compute platform from the plurality of compute platforms based on the SLO, and cause the second request to be sent to both the second compute platform and the third compute platform.

Example 24 includes the at least one non-transitory computer readable medium of example 22, wherein the first request is from a first one of the compute platforms in the compute infrastructure, and the instructions cause the at least one processor to cause the response to be discarded from the queue to prevent the response from being forwarded to the first one of the compute platforms.

Example 25 includes the at least one non-transitory computer readable medium of any one of examples 21 to 24, wherein the service is to update a status of the execution of the service by the first compute platform in a memory region, and the instructions cause the at least one processor to monitor the status to determine whether the execution of the service by the first compute platform has stalled, and detect the failure condition when the execution of the service has stalled.

Example 26 includes the at least one non-transitory computer readable medium of example 25, wherein the service is associated with a certificate, and the instructions cause the at least one processor to validate the update of the status by the service based on the certificate.

Example 27 includes the at least one non-transitory computer readable medium of example 25, wherein the memory region is a protected memory region associated with a trusted domain of the service.

Example 28 includes the at least one non-transitory computer readable medium of any one of examples 21 to 24, wherein the instructions cause the at least one processor to monitor one or more operational characteristics of the first compute platform, and detect the failure condition based on the one or more operational characteristics.

Example 29 includes an apparatus to perform service failover, the apparatus comprising memory, instructions, and processor circuitry to execute the instructions to at least cause a request to execute a service to be forwarded to a plurality of compute platforms included in a compute infrastructure, monitor for responses to the request, respective ones of the responses to indicate execution of the service by corresponding ones of the compute platforms has completed, cause a first one of the responses from a first one of the compute platforms to be forwarded, and cause subsequent ones of the responses from other ones of the compute platforms to be discarded, the other ones of the compute platforms not including the first one of the compute platforms.

Example 30 includes the apparatus of example 29, wherein the first one of the responses is earlier than the subsequent ones of the responses.

Example 31 includes the apparatus of example 29 or example 30, wherein the plurality of compute platforms is a first plurality of compute platforms included in a second plurality of compute platforms of the compute platform, the request is from a second one of the compute platforms included in the second plurality of compute platforms, and the processor circuitry is to forward a first one of the responses to the second one of the compute platforms.

Example 32 includes the apparatus of example 31, wherein the first plurality of compute platforms is selected by the second one of the compute platforms.

Example 33 includes the apparatus of example 31, wherein the processor circuitry is to monitor performance characteristics associated with the second plurality of compute platforms, and report the performance characteristics to the second one of the compute platforms.

Example 34 includes the apparatus of example 31, wherein the processor circuitry is to report service topology information to the second one of the compute platforms, the service topology information to indicate whether the service is available on respective ones of the second plurality of compute platforms.

Example 35 includes the apparatus of any one of examples 29 to 34, wherein the apparatus corresponds to a switch that is to interconnect the plurality of compute platforms.

Example 36 includes the apparatus of examples 1 to 8, wherein the apparatus includes the first compute platform and the second compute platform, the processor circuitry is implemented by an IPU of the first compute platform, and further including an interconnect to communicatively couple the first compute platform and the second compute platform, wherein the processor circuitry is to send the second request to the second compute platform via the interconnect.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A server to perform service failover, the server comprising:
   processor circuitry to execute a service at the server; and
   a network controller to:
      detect a failure condition associated with execution of the service by the processor circuitry, the execution of the service responsive to a first request;
      send a second request to a second server to execute the service;
      monitor for receipt of a response to the first request after the second request has been sent to the second server;
      detect the response to the first request after the second request has been sent to the second server, the response to indicate execution of the service by the processor circuitry has completed; and
      discard the response.

2. The server of claim 1, wherein the first request is associated with a service level objective (SLO), and the network controller is to select the second server based on the SLO from a plurality of servers included in a compute infrastructure.

3. The server of claim 2, wherein the network controller is to:
   select the second server and a third server from the plurality of servers based on the SLO; and
   send the second request to both the second server and the third server.

4. The server of claim 2, wherein the first request is from a first one of the servers in the compute infrastructure, and the network controller is to discard the response to cause the response to not be forwarded to the first one of the servers.

5. The server of claim 1, further including memory with a first memory region to store a status of the execution of the service by the processor circuitry, the service is to update the status, and the network controller is to:
   monitor the status to determine whether the execution of the service by the processor circuitry has stalled; and
   detect the failure condition when the execution of the service has stalled.

6. The server of claim 5, wherein the service is associated with a certificate, and the network controller is to validate the update of the status by the service based on the certificate.

7. The server of claim 1, wherein the network controller is to:
   monitor one or more operational characteristics of the server; and
   detect the failure condition based on the one or more operational characteristics.

8. The server of claim 1, wherein the network controller is implemented by an IPU.

9. A network controller to perform service failover, the network controller comprising:
   first monitoring circuitry to detect a failure condition associated with execution of a service by a first compute platform, the execution of the service responsive to a first request;
   request forwarding circuitry to send a second request to a second compute platform to execute the service; and
   second monitoring circuitry to:
      monitor for receipt of a response to the first request after the second request has been sent to the second compute platform;
      detect the response to the first request after the second request has been sent to the second compute platform, the response to indicate execution of the service by the first compute platform has completed; and
      discard the response.

10. The network controller of claim 9, wherein the first request is associated with a service level objective (SLO), and the request forwarding circuitry is to select the second compute platform based on the SLO from a plurality of compute platforms included in a compute infrastructure, the plurality of compute platforms including the first compute platform and the second compute platform.

11. The network controller of claim 10, wherein the request forwarding circuitry is to:
   select the second compute platform and a third compute platform from the plurality of compute platforms based on the SLO; and
   send the second request to both the second compute platform and the third compute platform.

12. The network controller of claim 10, wherein the first request is from a first one of the compute platforms in the compute infrastructure, and the second monitoring circuitry is to discard the response to cause the response to not be forwarded to the first one of the compute platforms.

13. The network controller of claim 9, wherein the service is to cause an update to a status of the execution of the service by the first compute platform to be stored in a memory, and the first monitoring circuitry is to:
   monitor the status to determine whether the execution of the service by the first compute platform has stalled; and
   detect the failure condition when the execution of the service has stalled.

14. At least one non-transitory computer readable medium comprising computer readable instructions that, when executed, cause a network controller to at least:

cause a request to be sent to a second compute platform to execute a service after detection of a failure condition associated with execution of the service by a first compute platform;

after the request has been sent to the second compute platform, monitor for receipt of an indication that execution of the service by the first compute platform has completed;

detect the indication after the request has been sent to the second compute platform; and discard the indication.

15. The at least one non-transitory computer readable medium of claim 14, wherein the instructions are to cause the network controller to select the second compute platform based on a service level objective (SLO) from a plurality of compute platforms included in a compute infrastructure, the plurality of compute platforms including the first compute platform and the second compute platform.

16. The at least one non-transitory computer readable medium of claim 15, wherein the instructions are to cause the network controller to:

select the second compute platform and a third compute platform from the plurality of compute platforms based on the SLO; and cause the request to be sent to both the second compute platform and the third compute platform.

17. The at least one non-transitory computer readable medium of claim 15, wherein the instructions are to cause the network controller to cause the indication to be discarded to prevent the indication from being forwarded to a first one of the compute platforms.

18. The at least one non-transitory computer readable medium of claim 14, wherein the service is to update a status of the execution of the service by the first compute platform in a memory region, and the instructions are to cause the network controller to:

monitor the status to determine whether the execution of the service by the first compute platform has stalled; and detect the failure condition when the execution of the service has stalled.

19. The at least one non-transitory computer readable medium of claim 18, wherein the service is associated with a certificate, and the instructions are to cause the network controller to validate the update of the status by the service based on the certificate.

* * * * *